United States Patent
Okazaki et al.

[11] Patent Number: 5,945,209
[45] Date of Patent: Aug. 31, 1999

[54] ANTI-REFLECTION FILM AND PLASMA DISPLAY PANEL

[75] Inventors: Masaki Okazaki; Toru Harada; Tomokazu Yasuda, all of Kanagawa, Japan

[73] Assignee: Fuji Photo Film Co., Ltd., Minami-ashigara, Japan

[21] Appl. No.: 08/966,364

[22] Filed: Nov. 7, 1997

[30] Foreign Application Priority Data

Nov. 7, 1996 [JP] Japan ................................. 8-295053

[51] Int. Cl.⁶ ........................................................ B32B 3/26
[52] U.S. Cl. ..................... 428/304.4; 428/402; 428/412; 428/421; 430/495.1; 430/517; 430/523
[58] Field of Search .............................. 428/49, 402, 327, 428/412, 688, 696, 699, 421, 304.4; 430/495.1, 517, 523, 531

[56] References Cited

U.S. PATENT DOCUMENTS

| | | | |
|---|---|---|---|
| 5,244,770 | 9/1993 | DeBoer et al. | 430/200 |
| 5,248,545 | 9/1993 | Proscia | 428/212 |
| 5,251,202 | 10/1993 | Kaneko et al. | 369/286 |
| 5,393,443 | 2/1995 | Satake et al. | 252/62 |
| 5,449,558 | 9/1995 | Hasegawa et al. | 428/422 |
| 5,520,996 | 5/1996 | Balian et al. | 428/216 |
| 5,712,024 | 1/1998 | Okuzaki et al. | 428/195 |

*Primary Examiner*—Elizabeth Evans
*Attorney, Agent, or Firm*—Burns, Doane, Swecker & Mathis, LLP

[57] ABSTRACT

An anti-reflection film comprises a low refractive index layer provided on one surface of a transparent support. The low refractive index layer has a refractive index of not higher than 1.45. The low refractive index layer has a surface average reflectance of not higher than 1% within the visible region of 400 to 800 nm. According to the first embodiment of the present invention, an infrared absorbing layer is provided between the transparent support and the low refractive index layer. According to the second embodiment of the present invention, an infrared absorbing layer is provided on the other surface of the transparent support. The infrared absorbing layer contains an infrared absorbing dye. The infrared absorbing layer decreases a transmittance of the film to not higher than 40% at a wavelength within the infrared region of 800 to 1,100 nm. Plasma display panels using the anti-reflection films are also disclosed.

12 Claims, 2 Drawing Sheets

ANTI-REFLECTION FILM AND PLASMA DISPLAY PANEL

FIELD OF THE INVENTION

The present invention relates to an anti-reflection film for improving visibility of a display device.

BACKGROUND OF THE INVENTION

A flat panel display has recently been developed to be used in place of a conventional CRT display. The flat panel displays include LCD (liquid crystal display), PDP (plasma display panel) and EL (electroluminescence display). The liquid crystal display has already been used in practice. Further, the development of the plasma display panel has reached a practical stage. The flat panel display as well as the CRT display has a problem of reflection of light, which degrades the visibility of the display.

An anti-reflection film has been proposed to solve the problem of reflection of light. For example, Japanese Patent Provisional Publication No. 59(1984)-50401 discloses an anti-reflection film having a double layered structure shown in FIG. 2 and an anti-reflection film having a triple layered structure shown in FIG. 1.

The anti-reflection film shown in FIG. 1 comprises a transparent support (11, base), a high refractive index layer (12, first layer) and a low refractive index layer (13, second layer) in the order. According to the invention of Japanese Patent Provisional Publication No. 59(1984)-50401, the refractive index ($n_1$) and the thickness ($d_1$) of the high refractive index layer as well as the refractive index ($n_2$) and the thickness ($d_2$) of the low refractive index layer satisfy the following formulas:

(High refractive index layer)

$$\frac{m}{4}\lambda \times 0.7 < n_1 d_1 < \frac{m}{4}\lambda \times 1.3$$

(Low refractive index layer)

$$\frac{n}{4}\lambda \times 0.7 < n_2 d_2 < \frac{n}{4}\lambda \times 1.3$$

in which m is a positive integer, n is a positive odd number, and λ is a standard wavelength (nm) selected from the visible region.

The anti-reflection film shown in FIG. 2 comprises a transparent support (21, base), a middle refractive index layer (22, first layer), a high refractive index layer (23, second layer) and a low refractive index layer (24, third layer) in the order. According to the invention of Japanese Patent Provisional Publication No. 59(1984)-50401, the refractive index ($n_1$) and the thickness ($d_1$) of the middle refractive index layer, the refractive index ($n_2$) and the thickness ($d_2$) of the high refractive index layer as well as the refractive index ($n_3$) and the thickness ($d_3$) of the low refractive index layer satisfy the following formulas:

(Middle refractive index layer)

$$\frac{1}{4}\lambda \times 0.7 < n_1 d_1 < \frac{1}{4}\lambda \times 1.3$$

(High refractive index layer)

$$\frac{m}{4}\lambda \times 0.7 < n_2 d_2 < \frac{m}{4}\lambda \times 1.3$$

(Low refractive index layer)

$$\frac{n}{4}\lambda \times 0.7 < n_3 d_3 < \frac{n}{4}\lambda \times 1.3$$

in which 1 is a positive integer, m is a positive integer, n is a positive odd number, and λ is a standard wavelength (nm) selected from the visible region.

SUMMARY OF THE INVENTION

A plasma display panel (PDP) has another problem of emission of infrared rays as well as the problem of reflection of light. The plasma display panel emits infrared rays. A remote controller uses infrared rays. Accordingly, the remote controller sometimes malfunctions while the plasma display panel is used. Therefore, the emitted infrared rays should be shielded.

An infrared absorbent has been added to a plastic plate to solve the problem. The plastic plate functions as a protective plate of a front glass plate of the display panel. However, the infrared absorbent should be heat-resistant to be added into a plastic plate. The requirement of the heat-resistance limits the kinds of the infrared absorbents used in the plasma display panel.

The infrared absorbent preferably has large absorption within the infrared region and little absorption within the visible region. The known heat-resistant infrared absorbents usually have insufficient absorption within the infrared region or remarkable absorption within the visible region.

Now, the applicants has tried to add a function of shielding infrared rays to an anti-reflection film.

An object of the present invention is to provide a film having an infrared ray shielding function as well as an anti-reflection function, which can advantageously be used with a plasma display panel.

The present invention provides an anti-reflection film comprising a transparent support, an infrared absorbing layer containing an infrared absorbing dye and a low refractive index layer in the order, said low refractive index layer having a refractive index of not higher than 1.45, said low refractive index layer having a surface average reflectance of not higher than 1% within the wavelength range (visible region) of 400 to 800 nm, and said film having a transmittance of not higher than 40% at a wavelength within the wavelength range (infrared region) of 800 to 1,100 nm.

The invention also provides a plasma display panel having a display surface covered with the anti-reflection film of the first embodiment defined above.

The invention further provides an anti-reflection film of the second embodiment comprising an infrared absorbing layer containing an infrared absorbing dye, a transparent support and a low refractive index layer in the order, said low refractive index layer having a refractive index of not higher than 1.45, said low refractive index layer having a surface average reflectance of not higher than 1% within the wavelength range (visible region) of 400 to 800 nm, and said film having a transmittance of not higher than 40% at a wavelength within the wavelength range (infrared region) of 800 to 1,100 nm.

The invention furthermore provides a plasma display panel having a display surface covered with the anti-reflection film of the second embodiment defined above.

According to the present invention, an infrared absorbing layer is provided in an anti-reflection film, which is attached to a display surface of a plasma display panel.

The infrared absorbing layer can be formed according to a moderate method, such as a coating method. Accordingly, an infrared absorbing dye having a low heat resistance can be used in the plasma display panel. For example, the film of the present invention can use many infrared absorbing dyes developed in the technical fields of conventional silver halide photographic materials. The conventional silver halide photographic materials are not treated at a high temperature in preparation or use thereof. Accordingly, infrared absorbing dyes used in the photogrpahic materials do not need a heat resistance. On the other hand, the functions of dyes used in the photogrpahic materials are severely restricted to reproduce an image of high quality. Accordingly, excellent infrared absorbing dyes have been developed in the technical fields of the photogrpahic materials. Some infrared absorbing dyes have an ideal curve of the spectrum. Therefore, infrared rays emitted from the plasma display panel can be shielded by using the excellent infrared absorbing dyes without influence on a displayed image within the visible region.

Further, infrared rays can be almost completely shielded with an anti-reflection film because the film is attached to a display surface. An electromagnetic wave shielding filter of a color compensating filter is placed in front of a display. The infrared absorbing dye can be added to the filter. However, infrared rays cannot be completely shielded with the filter because the filter is placed apart from the display surface.

DETAILED DESCRIPTION OF THE INVENTION

Layered structure

The anti-reflection film of the first embodiment comprises a transparent support, an infrared absorbing layer and a low refractive index layer in the order. A high refractive index layer is preferably provided between the infrared absorbing layer and the low refractive index layer.

Figure 1:
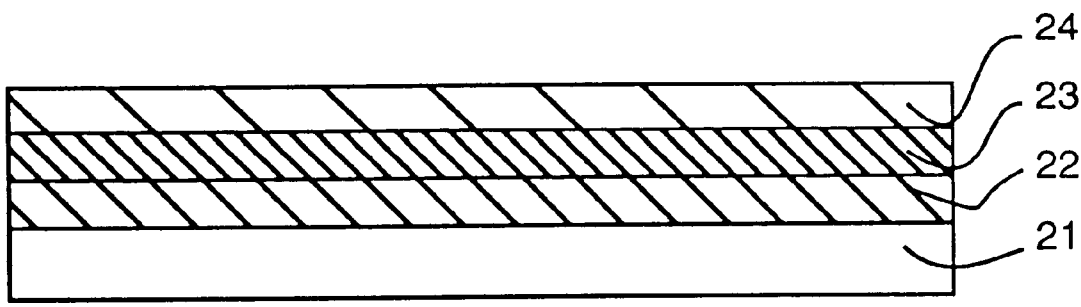
FIG. 1 is a cross-sectional view schematically showing an anti-reflection film disclosed in Japanese Patent Provisional Publication No. 59(1984)-50401.
Figure 2:
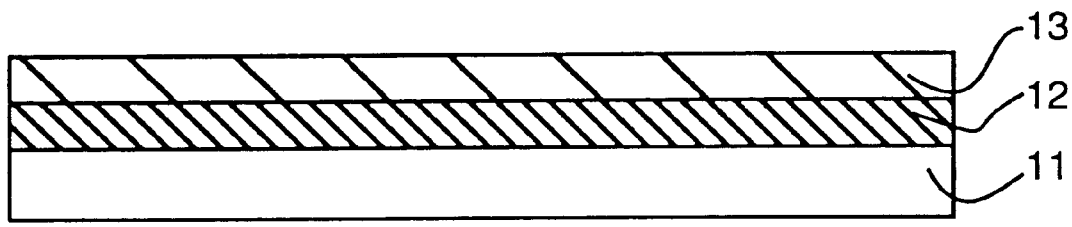
FIG. 2 is a cross-sectional view schematically showing another anti-reflection film disclosed in Japanese Patent Provisional Publication No. 59(1984)-50401.
Figure 3:
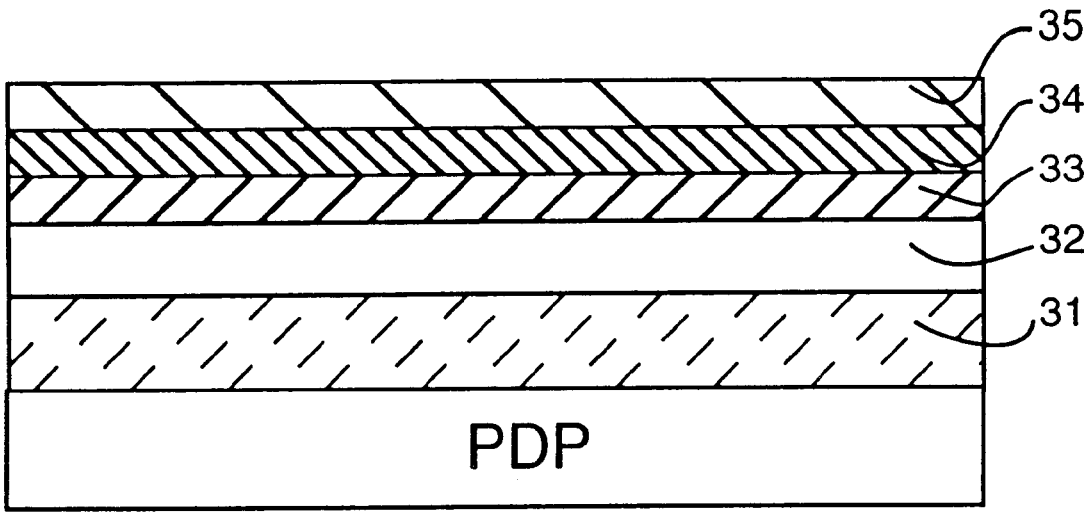
FIG. 3 is a cross-sectional view schematically showing a preferred layered structure of the first embodiment of the present invention.

FIG. 3 is a cross-sectional view schematically showing a preferred layered structure of the first embodiment of the present invention.

As is shown in FIG. 3, an anti-reflection film (32 to 35) is attached to a display surface plate (31) of a plasma display panel (PDP). The display surface plate (31) means a front glass plate or a plastic plate (protective plate) provided on the front glass plate. The anti-reflection film comprises a transparent support (32), an infrared absorbing layer (33), a high refractive index layer (34) and a low refractive index layer (35) in the order. The infrared absorbing layer (33) has another function as a hard coating layer, which increases the adhesion between the transparent support (32) and the high refractive index layer (34).

The anti-reflection film of the second embodiment comprises an infrared absorbing layer, a transparent support and a low refractive index layer in the order. A high refractive d index layer is preferably provided between the transparent support and the low refractive index layer, A hard coating layer is also preferably provided between the transparent support and the low refractive index layer of the high refractive index layer.

Figure 4:
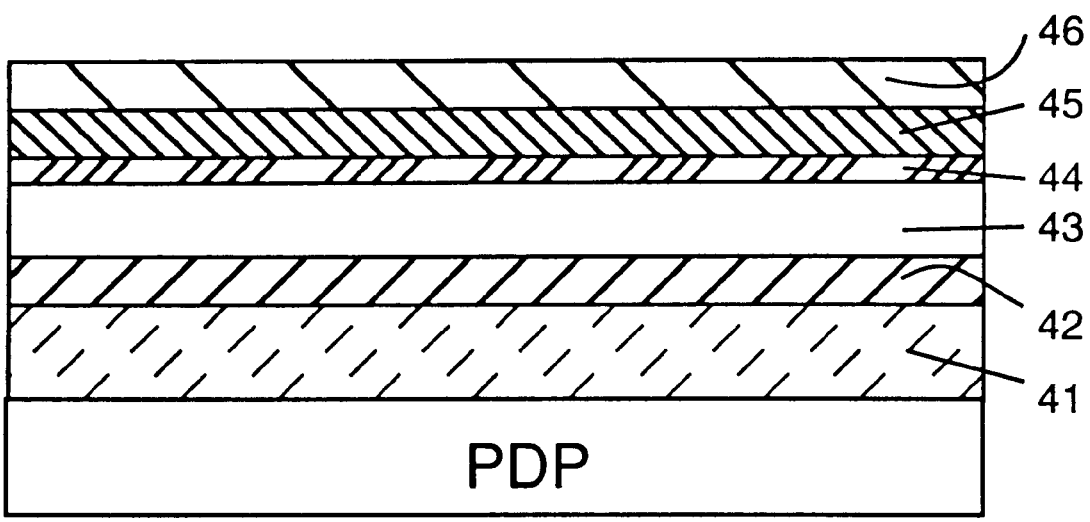
FIG. 4 is a cross-sectional view schematically showing a preferred layered structure of the second embodiment of the present invention.

FIG. 4 is a cross-sectional view schematically showing a preferred layered structure of the second embodiment of the present invention.

As is shown in FIG. 4, an anti-reflection film (42 to 46) is attached to a display surface plate (41) of a plasma display panel (PDP). The anti-reflection film comprises an infrared absorbing layer (42), a transparent support (43), a hard coating layer (44), a high refractive index layer (45) and a low refractive index layer (46) in the order. The hard coating layer (44) has a function of increasing the adhesion between the transparent support (43) and the high refractive index layer (45). Therefore, the hard coating layer contains an adhesive polymer or compound as a binder or matrix. Examples of the adhesive polymers and compounds include acrylic polymers, urethane polymers, epoxy polymers and silica compounds.

The first and second embodiments can be combined to provide two infrared absorbing layers in the anti-reflection film.

Other optional layers such as a middle refractive index layer, an anti-moisture layer or an anti-static layer can be provided in the anti-reflection film.

The layers can be formed by coating the components on the transparent support according to a conventional coating method such as a dip coating method, an air knife coating method, a curtain coating method, a roller coating method, a wire -bar coating method, a graver coating method or an extrusion coating method using a hopper (described in U.S. Pat. No. 2,681,294). Two or more layers can be simultaneously coated on the transparent support. The simultaneous coating method is described in U.S. Pat. Nos. 2,761,791, 2,941,898, 3,508,947 and 3,526,528.

The total thickness of the anti-reflection film (32 to 35 in FIG. 3 or 42 to 46 in FIG. 4) is preferably in the range of 20 to 800 μm, more preferably in the range of 50 to 300 μm, and most preferably in the range of 75 to 200 μm.

Infrared absorbing layer

The infrared absorbing layer contains an infrared absorbing dye. The infrared absorbing layer has a function of decreasing a transmittance of the film to not higher than 40% at a wavelength within the infrared region of 800 to 1,100 nm. The wavelength is preferably selected from the region of 800 to 1,000 nm, more preferably 800 to 950 nm, and most preferably 800 to 900 nm. Further, the transmittance of the film is preferably not higher than 30%, more preferably not higher than 20%, further preferably not higher than 10%, and most preferably not higher than 5%.

The anti-reflection film preferably has the maximum transmittance of not higher than 40% at a wavelength within the infrared region of 800 to 1,100 nm. The maximum transmittance within the infrared region is more preferably not higher than 30%, further preferably not higher than 20%, and most preferably not higher than 10%. Further, the anti-reflection film preferably has an average transmittance of not lower than 50% within the visible region of 400 to 700 nm. The average transmittance within the visible region is more preferably not lower than 60%, further preferably not lower than 70%, and most preferably not lower than 80%.

The present invention is characterized in that there is no specific limitation about an infrared absorbing dye. Accordingly, the infrared absorbing dye can be determined depending on the infrared absorbing function of the dye. The film preferably uses a dye having large absorption within the infrared region and little absorption within the visible region. In more detail, the dye is preferably so selected that the transmittances of the film within the infrared and visible regions are defined above.

The maximum absorption wave length of the dye is preferably in the range of 700 to 1,200 nm, and more preferably in the range of 800 to 1,100 nm. The infrared absorbing dyes include organic and inorganic compounds. An organic dye is preferred to an inorganic dye. Examples of the infrared absorbing dyes include cyanine compounds, metal chelate compounds, aminium compounds, diiminium compounds, quinone compounds, squarilium compounds and methine compounds.

The present invention preferably uses infrared absorbing dyes developed in the technical fields of silver halide photographic materials. Examples of the developed dyes include dihydroperimidine squarilium dyes (described in U.S. Pat. No. 5,380,635 and Japanese Patent Application No. 8(1986)-189817), cyanine dyes (described in Japanese Patent Provisional Publication Nos. 62(1987)-123454, 3(1991)-138640, 3(1991)-211542, 3(1991)-226736, 5(1993)-313305, 6(1994)-43583, Japanese Patent Application No. 7(1995)-269097 and European Patent No. 0430224), pyrylium dyes (described in Japanese Patent Provisional Publication Nos. 3(1991)-138640, 3(1991)-211542), diiminium dyes (described in Japanese Patent Provisional Publication Nos. 3(1991)-138640, 3(1991)-211542), pyrazolopyridone dyes (described in Japanese Patent Provisional Publication No. 2(1990)-28244), indoaniline dyes (described in Japanese Patent Provisional Publication Nos. 5(1993)-323500, 5(1993)-323501), polymethine dyes (described in Japanese Patent Provisional Publication Nos. 3(1991)-26765, 4(1992)-190343, European Patent No. 377961), oxonol dyes (described in Japanese Patent Provisional Publication No. 3(1991)-9346), anthraquinone dyes (described in Japanese Patent Provisional Publication No. 4(1992)-13654), naphthalocyanine dyes (described in U.S. Pat. No. 5,009,989) and naphtholactam dyes (described in European Patent No. 568267).

Preferred infrared absorbing dyes include the cyanine dyes represented by the formula (I), the dihydroperimidine squarilium dyes represented by the formula (III), the naphthooxazinine squarilium dyes represented by the formula (IV), the diiminium dyes represented by the formula (V), the polymethine dyes represented by the formula (VI), the azomethine dyes represented by the formula (VII) and the oxonol dyes represented by the formula (VIII).

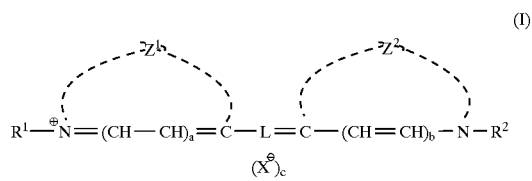

(I)

in which each of $Z^1$ and $Z^2$ independently is a non-metallic atomic group that forms a five-membered or six-membered nitrogen-containing heterocyclic ring, which may be condensed with another ring; each of $R^1$ and $R^2$ independently is an alkyl group, an alkenyl group or an aralkyl group; L is a linking group having conjugated double bonds formed by a combination of five, seven, nine or eleven methine groups; each of a, b and c independently is 0 or 1; and X is an anion.

In the formula (I), each of $Z^1$ and $Z^2$ independently is a non-metallic atomic group that forms a five-membered or six-membered nitrogen-containing heterocyclic ring. The ring may be condensed with another ring. Examples of the heterocyclic rings and the condensed rings include oxazole ring, isooxazole ring, benzoxazole ring, naphthoxazole ring, thiazole ring, benzthiazole ring, naphthothiazole ring, indolenine ring, benzindolenine ring, imidazole ring, benzimidazole ring, naphthimidazole ring, quinoline ring, pyridine ring, pyrrolopyridine ring, furopyrrole ring, indolizine ring, imidazoquinoxaline ring and quinoxaline ring. The nitrogen-containing heterocyclic ring preferably is a five-membered ring. The five-membered heterocyclic ring is preferably condensed with benzene ring or naphthalens ring. Indolenine ring and benzindolenine ring are particularly preferred.

The heterocyclic ring and the condensed ring may have a substituect group. Examples of the substituent groups include an alkyl group having 10 or less (preferably 6 or less) carbon atoms (e.g., methyl, ethyl, propyl, butyl, isobutyl, pentyl, hexyl), an alkoxy group having 10 or less (preferably 6 or less) carbon atoms (e.g., methoxy, ethoxy), an aryloxy group having 20 or less (preferably 12 or less) carbon atoms (e.g., phenoxy, p-chlorophenoxy), a halogen atom (Cl, Br, F), an alkoxycarbonyl group having 10 or less (preferably 6 or less) carbon atoms (e.g., ethoxycarbonyl), cyano, nitro and carboxyl. Carboxyl may form a salt with a cation. Further, carboxyl may form an intramolecular salt with $N^+$ in the formula (I). Preferred substituent groups include chloride (Cl), methoxy, methyl and carboxyl.

In the case that the heterocyclic ring is substituted with carboxyl, the absorption maximum wavelength is greatly increased where the dye is in the form of solid fine particles.

On the other hand, a compound having no carboxyl group is preferably dispersed for a long term to form the solid fine particles. The maximum absorption of the compound is shifted to a long wave region by dispersing the compound for a long term. Further, the below-described formula (Ic) is particularly preferred in the case that the compound has no carboxyl group.

In the formula (I), each of $R^1$ and $R^2$ independently is an alkyl group, an alkenyl group or an aralkyl group. An alkyl group is preferred. An alkyl group having no substituent group is particularly preferred.

The alkyl group preferably has 1 to 10 carbon atoms, and more preferably has 1 to 6 carbon atoms. Examples of the alkyl groups include methyl, ethyl, propyl, butyl, isobutyl, pentyl and hexyl. The alkyl group may have a substituent group. Examples of the substituent groups include a halogen atom (Cl, Br, F), an alkoxycarbonyl group having 10 or less (preferably 6 or less) carbon atoms (e.g., methoxycarbonyl, ethoxycarbonyl) and hydroxyl.

The alkenyl group preferably has 2 to 10 carbon atoms, and more preferably has 2 to 6 carbon atoms. Examples of the alkenyl groups include 2-pentenyl, vinyl, allyl, 2-butenyl and 1-propenyl. The alkenyl group may have a substituent group. Examples of the substituent groups include a halogen atom (Cl, Br, F), an alkoxycarbonyl group having 10 or less (preferably 6 or less) carbon atoms (e.g., methoxycarbonyl, ethoxycarbonyl) and hydroxyl.

The aralkyl group preferably has 7 to 12 carbon atoms. Examples of the aralkyl groups include benzyl and phenethyl. The aralkyl group may have a substituent group. Examples of the substituent groups include a halogen atom (Cl, Br, F), an alkyl group having 10 or less (preferably 6 or less) carbon atoms (e.g., methyl) and an alkoxy group having 10 or less (preferably 6 or less) carbon atoms (e.g., methoxy).

In the formula (I), L is a linking group having conjugated double bonds formed by a combination of five, seven, nine or eleven methine groups. The number of the methine groups preferably is five (pentamethine compound), seven (heptamethine compound) or nine (nonamethine compound), more preferably is seven or nine, and most preferably is seven.

The methine groups may have a substituent group. The substituent group is preferably attached to the central (meso) methine group. The substituent groups are described below referring to the formula L5 (pentamethine), L7 (heptamethine) and L9 (nonamethine).

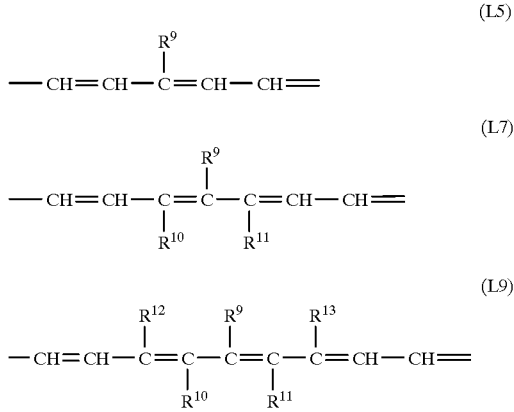

in which $R^9$ is hydrogen, an alkyl group, a halogen atom, an aryl group, —$NR^{14}R^{15}$ (wherein $R^{14}$ is an alkyl group or an aryl group, $R^{15}$ is hydrogen, an alkyl group, an aryl group, an alkylsulfonyl group, an arylsulfonyl group or an acyl group, or $R^{14}$ and $R^{15}$ are combined with each other to form a nitrogen-containing heterocyclic ring), an alkylthio group, an arylthio group, an alkoxy group or an aryloxy group; each of $R^{10}$ and $R^{11}$ is hydrogen, or $R^{10}$ and $R^{11}$ are combined with each other to form a five-membered or six-membered ring; and each of $R^{12}$ and $R^{13}$ independently is hydrogen or an alkyl group, $R^9$ preferably is —$NR^{14}R^{15}$. At least one of $R^{14}$ and $R^{15}$ preferably is phenyl.

$R^{10}$ and $R^{11}$ are preferably combined with each other to form a five-membered or six-membered ring. In the case that $R^9$ is hydrogen, $R^{10}$ and $R^{11}$ more preferably form the ring. Examples of the rings include cyclopentene ring and cyclohexene ring. The ring may have a substituent group (in addition to $R^9$). Examples of the substituent groups include an alkyl group and an aryl group.

The above-mentioned alkyl group preferably has 1 to 10 carbon atoms, and more preferably has 1 to 6 carbon atoms.

Examples of the alkyl groups include methyl, ethyl, propyl, butyl, isobutyl, pentyl and hexyl. The alkyl group may have a substituent group. Examples of the substituent groups include a halogen atom (Cl, Br, F), an alkoxycarbonyl group having 10 or less (preferably 6 or less) carbon atoms (e.g., methoxycarbonyl, ethoxycarbonyl) and hydroxyl.

Examples of the above-mentioned halogen atoms include fluorine, chlorine and bromine.

The above-mentioned aryl group preferably has 6 to 12 carbon atoms. Examples of the acryl groups include phenyl and naphthyl. The aryl group may have a substituent group. Examples of the substituent groups include an alkyl group having 10 or less (preferably 6 or less) carbon atoms (e.g., methyl, ethyl, propyl, butyl, isobutyl, pentyl, hexyl), an aryloxy group having 20 or less (preferably 12 or less) carbon atoms (e.g., phenoxy, p-chlorophenoxy), a halogen atom (Cl, Br, F), an alkoxycarbonyl group having 10 or less (preferably 6 or less) carbon atoms (e.g., ethoxy, carbonyl), cyano, nitro and carboxyl.

The above-mentioned alkylsulfonyl group preferably has 1 to 10 carbon atoms. Examples of the alkylsulfonyl groups include mesyl and ethanesulfonyl.

The above-mentioned arylsulfonyl group preferably has 6 to 10 carbon atoms. Examples of the arylsulfonyl groups include tosyl and benzoyl.

The above-mentioned acyl group preferably has 2 to 10 carbon atoms. Examples of the acyl groups include acetyl, propionyl and benzoyl.

Examples of the nitrogen-containing heterocyclic rings formed by $R^{14}$ and $R^{15}$ include piperidine ring, morpholine ring and piperazine ring. The heterocyclic ring may have a substituent group. Examples of the substituent groups include an alkyl group (e.g., methyl), an aryl group (e.g., phenyl) and an alkoxycarbonyl group (e.g., ethoxycarbonyl).

In the formula (I) each of a, b and c independently is 0 or 1. Each of a and b preferably is 0. On the other hand, c usually is 1. However, c may be 0 in the case that an anionic substituent group such as carboxyl forms an intramolecular salt with $N^+$ in the formula (I).

In the formula (I), X is an anion. Examples of the anions include halide ions (e.g., Cl$^-$, Er$^-$, I$^-$), p-toluenesulfonate ion, ethylsulfate ion, $PF_6^-$, $BF_4^-$ and $ClO_4^-$.

A more preferred heptamethine cyanine dye is represented by the formula (Ib):

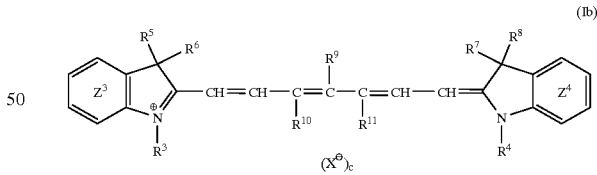

in which each of the benzene rings of $Z^3$ and $Z^4$ may be condensed with another benzene ring; each of $R^3$ and $R^4$ independently is an alkyl group, an alkenyl group or an aralkyl group; each of $R^5$, $R^6$, $R^7$ and $R^8$ independently is an alkyl group, or $R^5$ and $R^6$ or $R^7$ and $R^8$ are combined with each other to form a ring; $R^9$ is hydrogen, an alkyl group, a halogen atom, an aryl group, —$NR^{14}R^{15}$ (wherein $R^{14}$ is an alkyl group or an aryl group, $R^{15}$ is hydrogen, an alkyl group, an aryl group, an alkylsulfonyl group, an arylsulfonyl group or an acyl group, or $R^{14}$ and $R^{15}$ are combined with each other to form a nitrogen-containing heterocyclic ring), an alkylthio group, an arylthio group, an alkoxy group or an aryloxy group; each of $R^{10}$ and $R^{11}$ is hydrogen, or $R^{10}$ and $R^{11}$ are combined with each other to form a five-membered or six-membered ring; X is an anion; and c is 0 or 1.

In the formula (Ib), the benzene rings of $Z^3$ and $Z^4$ and another condensed benzene ring may have a substituent group. Examples of the substituent groups are the same as those of the substituent groups of $Z^1$ and $Z^2$ in the formula (I).

In the formula (Ib), $R^3$ and $R^4$ have the same meanings as $R^1$ and $R^2$ in the formula (I).

The alkyl group of $R^5$, $R^6$, $R^7$ and $R^8$ have the same meanings as the alkyl group of $R^1$ and $R^2$ in the formula (I). An example of the ring formed by $R^5$ and $R^6$ or $R^7$ and $R^8$ is cyclohexane ring.

In the formula (Ib), $R^9$, $R^{10}$ and $R^{11}$ have the same meanings as $R^9$, $R^{10}$ and $R^{11}$ in the formula (L7).

In the formula (Ib), X and c have the same meanings as X and c in the formula (I), A further preferred heptamethine cyanine dye is represented by the formula (IC).

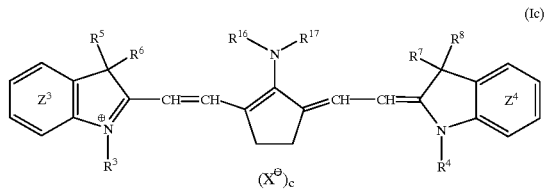

(Ic)

in which each of the benzene rings of $Z^3$ and $Z^4$ may be condensed with another benzene ring; each of $R^3$ and $R^4$ independently is an alkyl group, an alkenyl group or an aralkyl group; each of $R^5$, $R^6$, $R^7$ and $R^8$ independently is an alkyl group, or $R^5$ and $R^6$ or $R^7$ and $R^8$ are combined with each other to form a ring; each of $R^{16}$ and $R^{17}$ independently is an alkyl group or an aryl group; X is an anion, and c is 0 or 1.

In the formula (Ic), the benzene rings of $Z^3$ and $Z^4$ and another condensed benzene ring may have a substituent group. Examples of the substituent groups are the same as those of the substituent groups of $Z^1$ and $Z^2$ in the formula (I).

In the formula (Ic), $R^3$ and $R^4$ have the same meanings as $R^1$ and $R^2$ in the formula (I).

The alkyl group of $R^5$, $R^6$, $R^7$ and $R^8$ have the same meanings as the alkyl group of $R^1$ and $R^2$ in the formula (I). An example of the ring formed by $R^5$ and $R^6$ or $R^7$ and $R^8$ is cyclohexane ring.

The alkyl group of $R^{16}$ and $R^{17}$ have the same meanings as the alkyl group of $R^1$ and $R^2$ in the formula (I). The aryl group of $R^{16}$ and $R^{17}$ have the same meanings as the aryl group in the formulas (L5) to (L9).

In the formula (Ic), X and c have the same meanings as X and c in the formula (I).

Examples of the cyanine dyes are shown below.

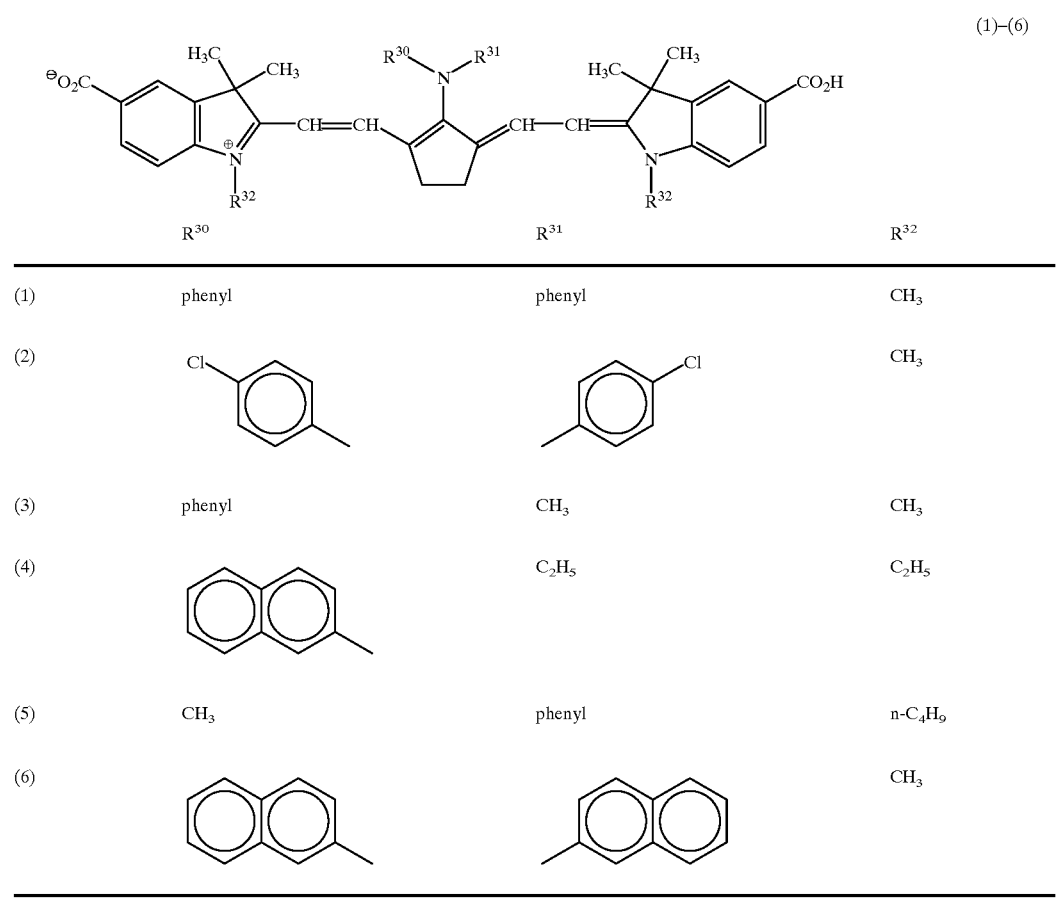

(7)–(11)

[Structure: bis-indolium cyanine dye with cyclohexene bridge bearing Cl and R34 substituents, N-substituents R33]

| | R33 | R34 |
|---|---|---|
| (7) | n-C4H9 | CH3 |
| (8) | n-C4H9 | t-C4H9 |
| (9) | n-C4H9 | phenyl |
| (10) | C3H7 | phenyl |
| (11) | n-C6H13 | t-C4H9 |

(12)–(19)

[Structure: bis-indolium cyanine dye with cyclohexene bridge bearing R35 and R36 substituents, N-substituents R37]

| | R35 | R36 | R37 |
|---|---|---|---|
| (12) | -S-C6H5 (phenylthio) | CH3 | CH3 |
| (13) | -S-C6H5 (phenylthio) | t-C4H9 | CH3 |
| (14) | -S-C6H4-CH3 (p-tolylthio) | phenyl | CH3 |
| (15) | -O-C6H5 (phenoxy) | t-C4H9 | CH3 |
| (16) | -O-C6H4-CH3 (p-methoxyphenyl/p-tolyloxy) | phenyl | CH3 |
| (17) | -NH-C6H5 (phenylamino) | t-C4H9 | CH3 |
| (18) | -N(CH3)-C6H5 (N-methylanilino) | t-C4H9 | CH3 |
| (19) | phenyl | H | C4H9 |

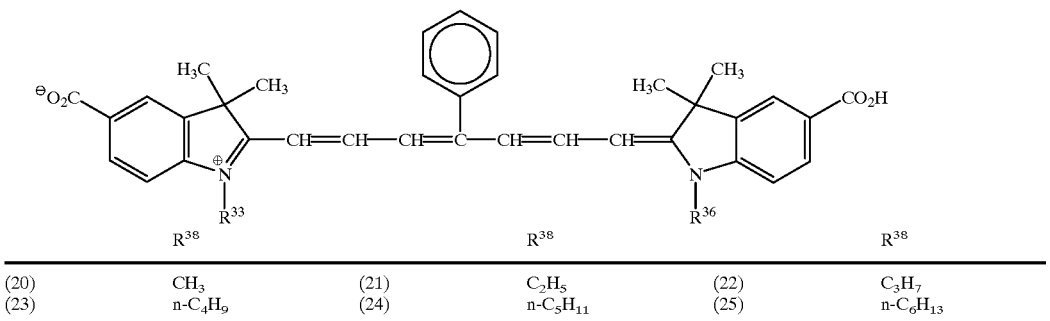
|      |                      |      |                                |      |                                |
|------|----------------------|------|--------------------------------|------|--------------------------------|
| (20) | CH$_3$               | (21) | C$_2$H$_5$                     | (22) | C$_3$H$_7$                     |
| (23) | n-C$_4$H$_9$         | (24) | n-C$_5$H$_{11}$                | (25) | n-C$_6$H$_{13}$                |
(26)–(30)
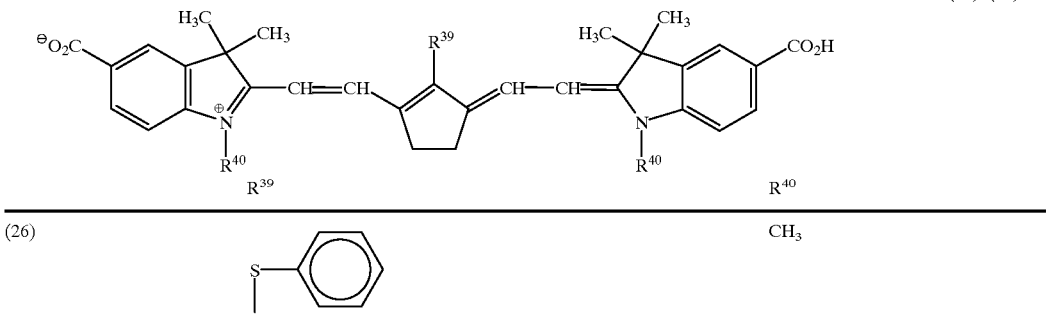
|      | R$^{39}$ | R$^{40}$ |
|------|----------|----------|
| (26) |  | CH$_3$ |
| (27) | (S-C$_6$H$_4$-CH$_3$) | n-C$_4$H$_9$ |
| (28) | (O-C$_6$H$_5$ with OCH$_3$) | n-C$_4$H$_9$ |
| (29) |  | CH$_3$ |
| (30) | (benzoyl-N(CH$_3$)-phenyl) | CH$_3$ |
(31)–(33)
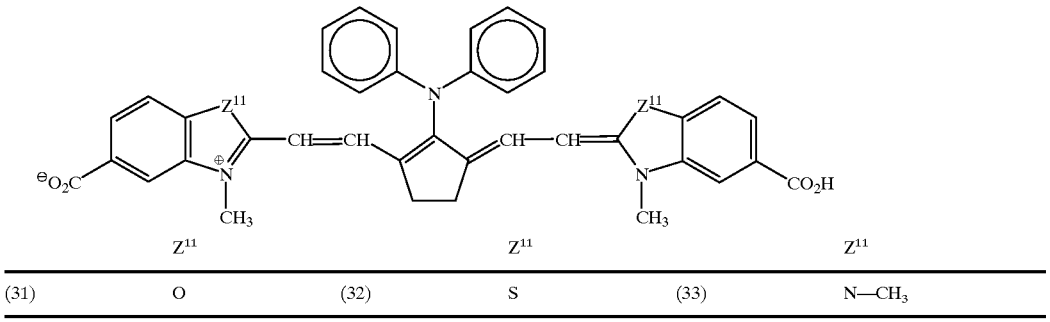
|      | Z$^{11}$ |      |     |      |         |
|------|----------|------|-----|------|---------|
| (31) | O        | (32) | S   | (33) | N—CH$_3$ |

(34)
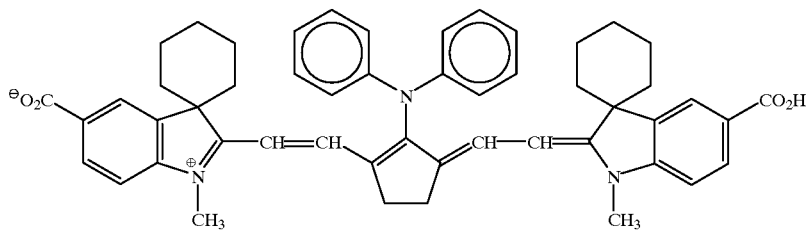
(35)–(36)
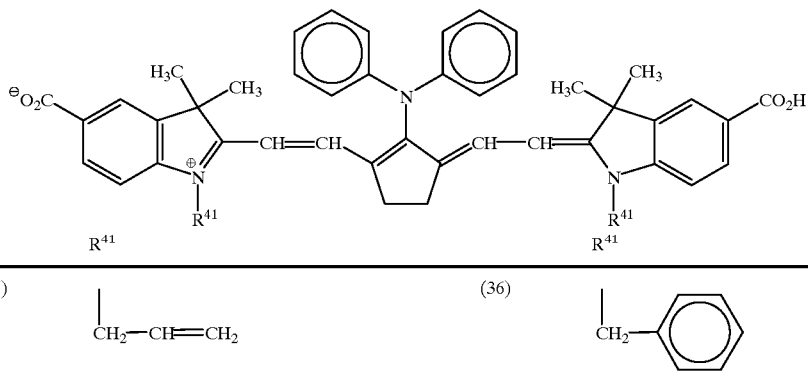
| (35) | CH₂—CH=CH₂ | (36) | CH₂—C₆H₅ |
(37)–(38)
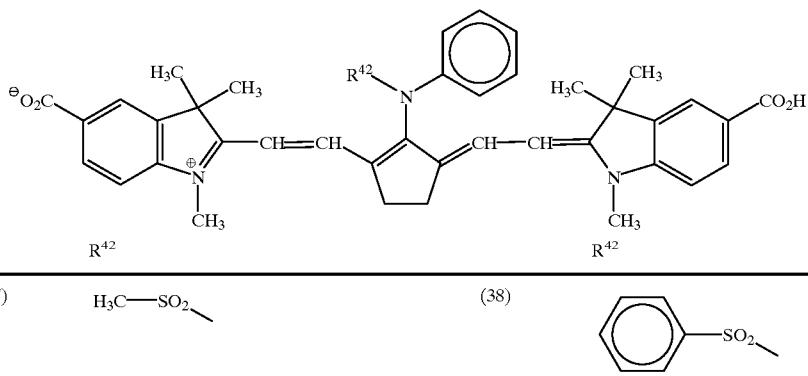
| (37) | H₃C—SO₂— | (38) | C₆H₅—SO₂— |
(39)–(42)
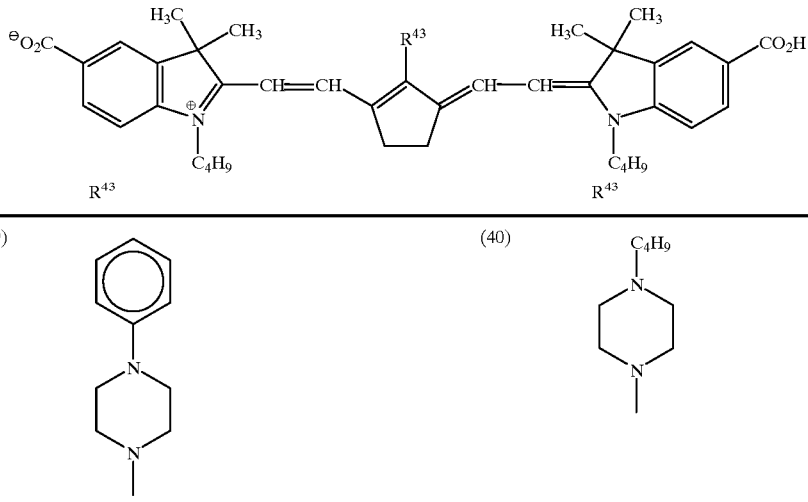

| | | | |
|---|---|---|---|
| (41) | 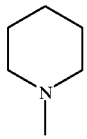 | (42) | Cl |
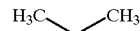
(43)–(52)
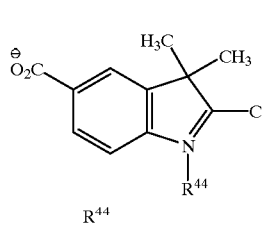 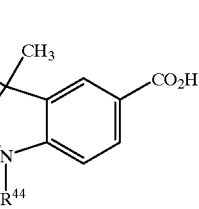
| (43) | CH$_3$ | (44) | C$_2$H$_5$ |
|---|---|---|---|
| (45) | n-C$_3$H$_7$ | (46) | n-C$_4$H$_9$ |
| (47) | 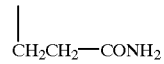 | (48) | 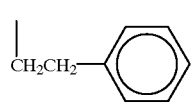 |
| (49) | 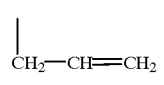 | (50) | 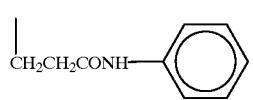 |
| (51) | 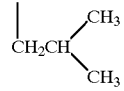 | (52) | 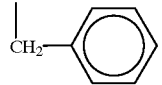 |
(53)–(55)
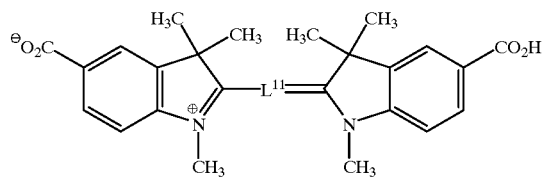
(53)
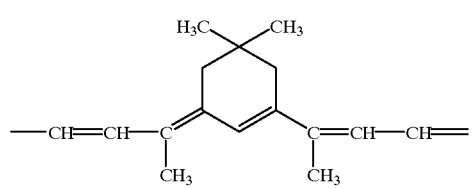
(54)
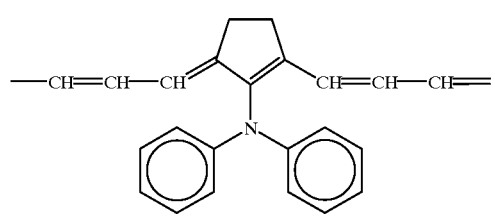

-continued
(55)
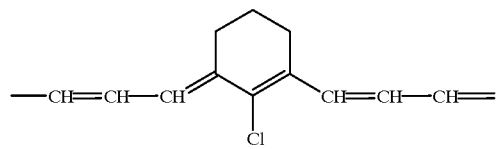
(56)–(60)
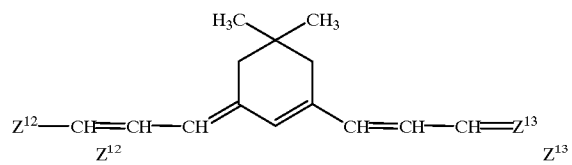
(56)
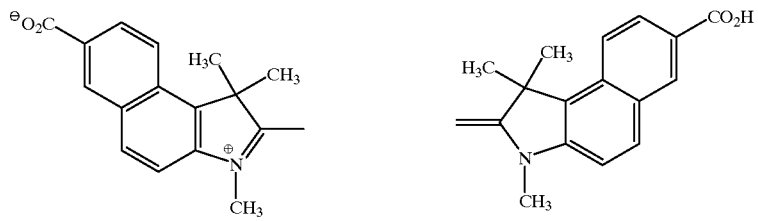
(57)
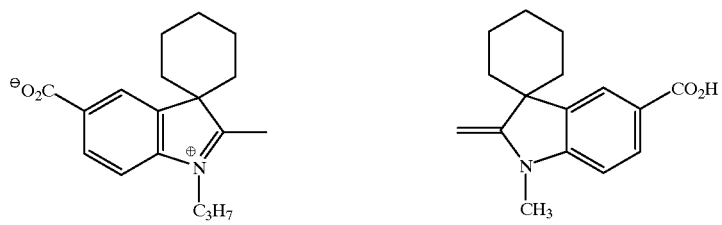
(58)
(59)
(60)
(61)
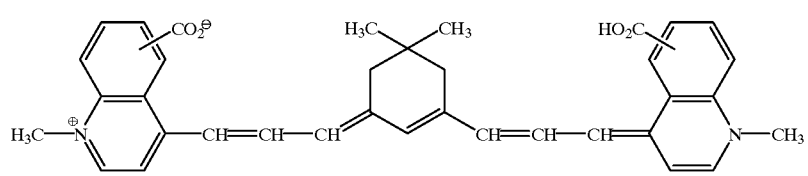

-continued (62)–(71)

[Structure: bis-indolium cyanine dye with diphenylamino-cyclopentene bridge, BF$_4^-$ counterion, substituents $R^{45}$, $R^{46}$, $R^{47}$, $R^{48}$]

| | $R^{45}$ | $R^{46}$ | $R^{47}$ | $R^{48}$ |
|---|---|---|---|---|
| (62) | CH$_3$ | H | H | H |
| (63) | CH$_3$ | H | Cl | H |
| (64) | CH$_3$ | H | OCH$_3$ | H |
| (65) | CH$_3$ | H | CN | H |
| (66) | CH$_3$ | H | CO$_2$C$_2$H$_5$ | H |
| (67) | CH$_3$ | H | NO$_2$ | H |
| (68) | CH$_3$ | H | CH$_3$ | H |
| (69) | CH$_3$ | H | Cl | Cl |
| (70) | CH$_3$ | Cl | H | Cl |
| (71) | C$_2$H$_5$ | H | Cl | H |

(72)–(81)

[Structure: bis(5-chloro-1,3,3-trimethylindolium) cyanine dye with R$^{49}$R$^{50}$N-cyclopentene bridge, BF$_4^-$ counterion]

| | $R^{49}$ | $R^{50}$ |
|---|---|---|
| (72) | CH$_3$ | phenyl |
| (73) | C$_2$H$_5$ | phenyl |
| (74) | 4-methylphenyl | 4-methylphenyl |
| (75) | 4-bromophenyl | 4-bromophenyl |
| (76) | 2,4-dichlorophenyl | 2,4-dichlorophenyl |
| (77) | 4-methoxyphenyl | 4-methoxyphenyl |
| (78) | 3-chlorophenyl | 3-chlorophenyl |
| (79) | CH$_3$ | CH$_3$ |
| (80) | C$_2$H$_5$ | C$_2$H$_5$ |
| (81) | CH$_3$OC(O)CH$_2$— | —CH$_2$C(O)OCH$_3$ |

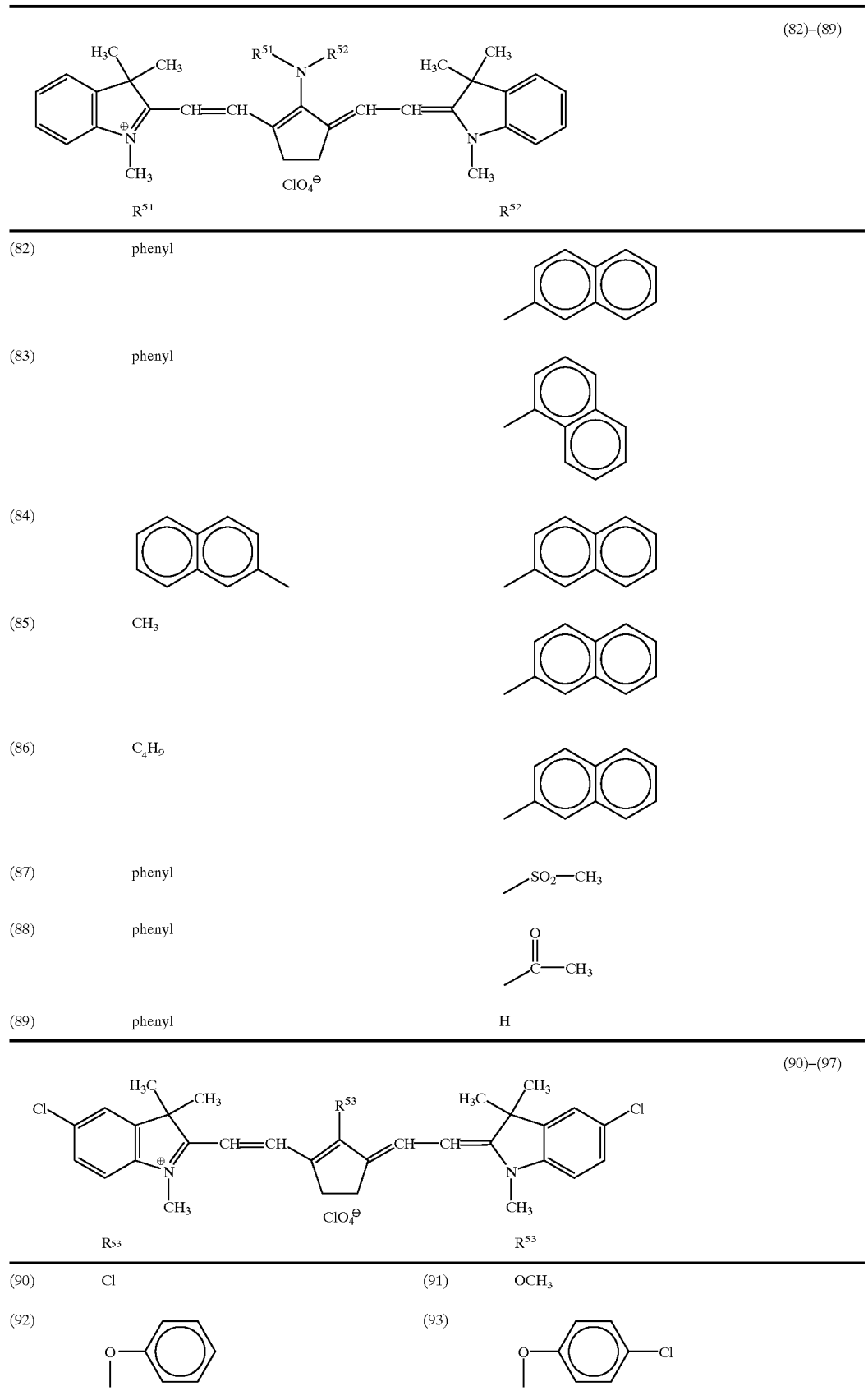

-continued
(94) 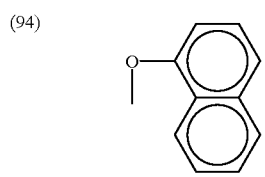   (95) 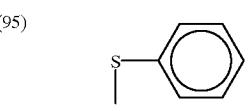
(96) 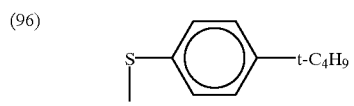   (97) 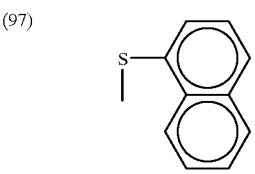
(98)–(105)
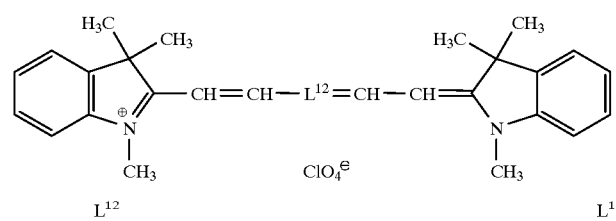
$L^{12}$      $L^{12}$
(98) 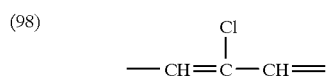   (99) 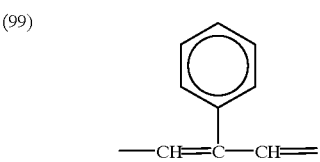
(100) 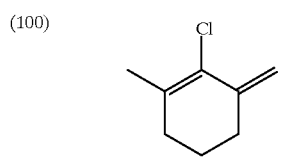   (101) 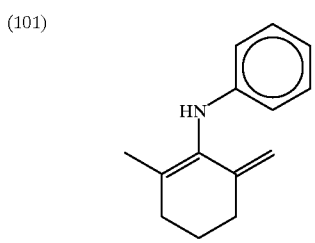
(102) 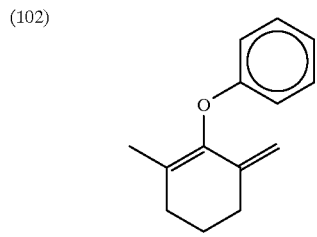   (103) 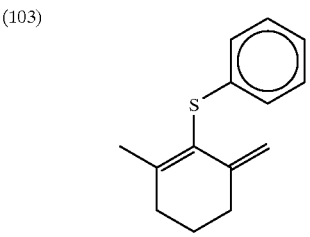
(104) 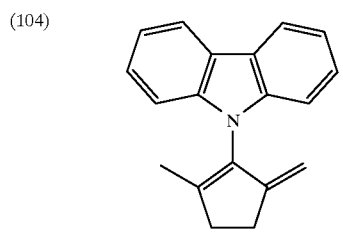   (105) 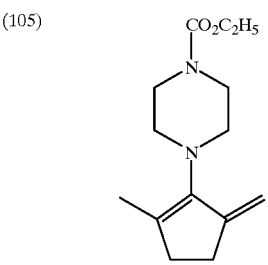

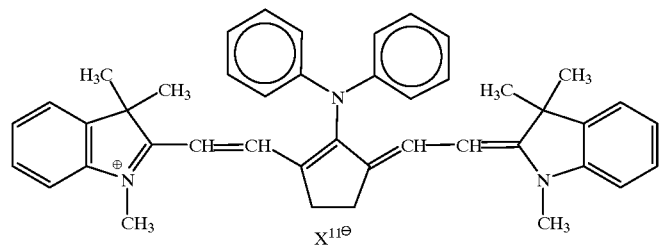
(106)–(110)
| | | | | |
|---|---|---|---|---|
| (106) | ClO$_4^\ominus$ | (107) | PF$_6^\ominus$ | |
| (108) |  | (109) | I$^\ominus$ | |
| (110) | Br$^\ominus$ | | | |
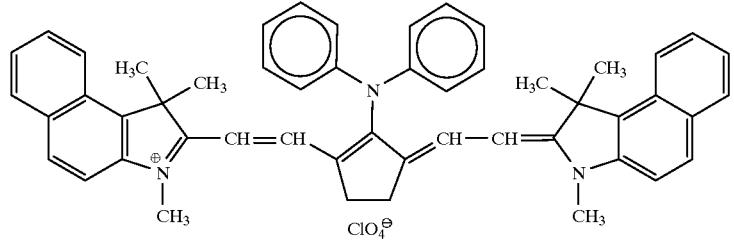
(111)
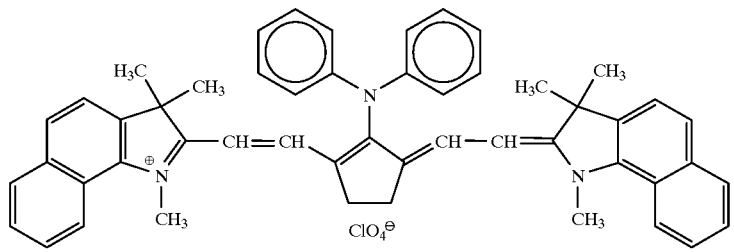
(112)
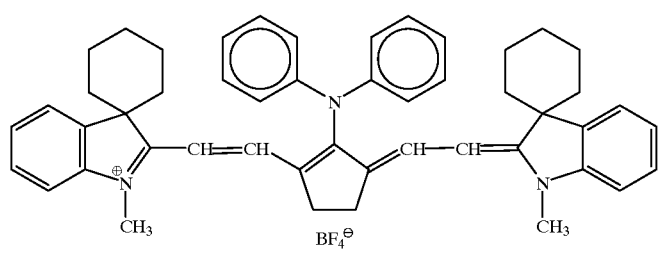
(113)

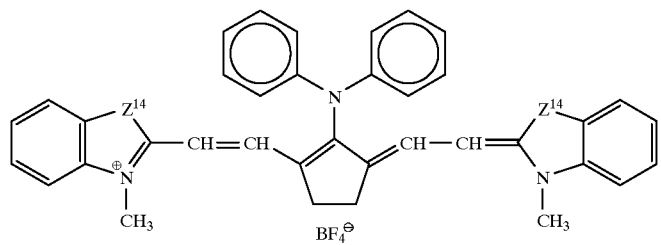
(114)–(116)
| | $Z^{14}$ | | $Z^{14}$ | | $Z^{14}$ |
|---|---|---|---|---|---|
| (114) | O | (115) | S | (116) | N—CH$_3$ |
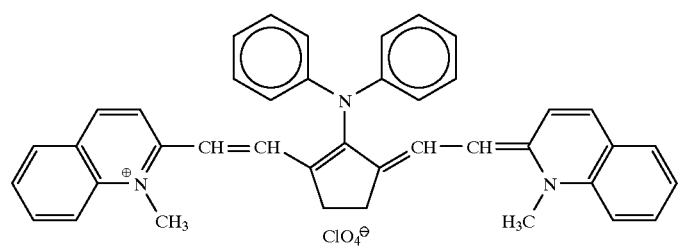
(117)
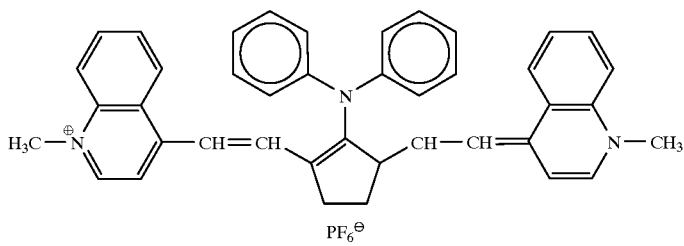
(118)
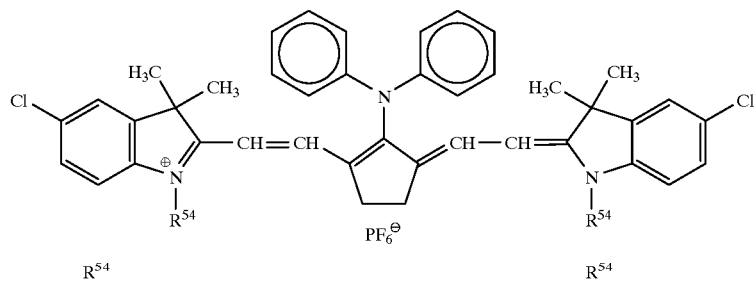
(119)–(120)
| | $R^{54}$ | | $R^{54}$ |
|---|---|---|---|
| (119) | 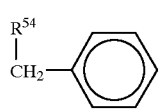 | (120) | 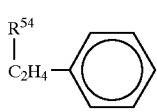 |
(121) 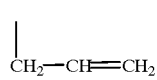

-continued
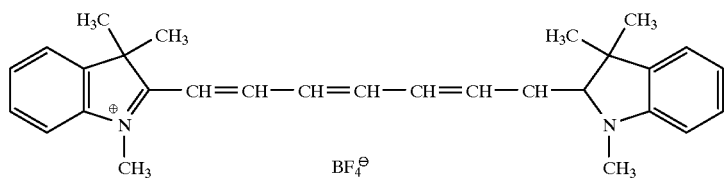
(122)
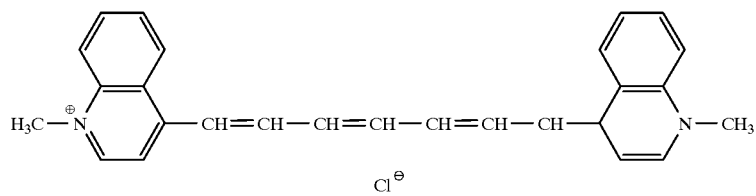
(123)
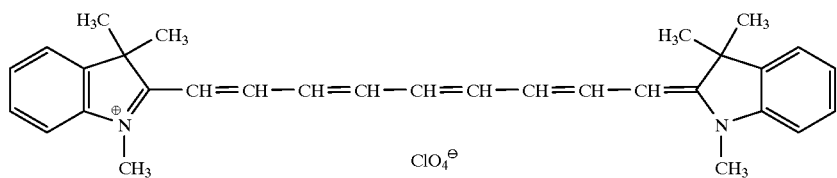
(124)
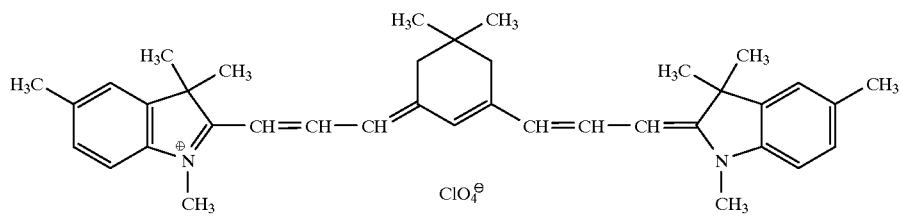
(125)
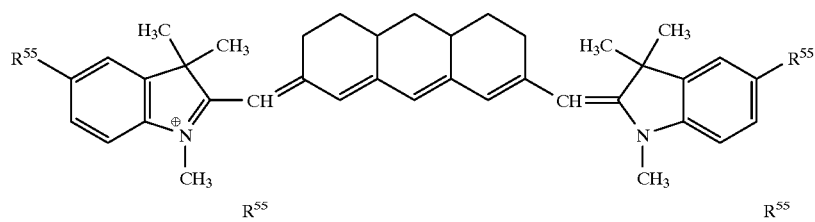
(126)–(127)
| | R⁵⁵ | | R⁵⁵ |
|---|---|---|---|
| (126) | H | (127) | CO₂H |
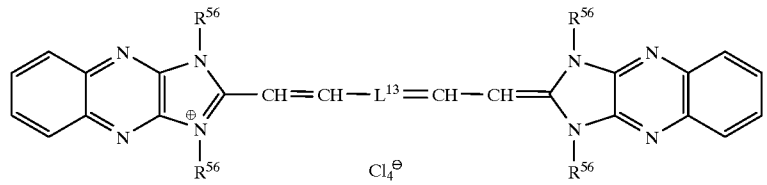
(128)–(130)
| | R⁵⁶ | | L¹³ |
|---|---|---|---|
| (128) | C₂H₄CO₂H | | —CH=CH—CH= |

-continued (129)  C₂H₄CO₂H  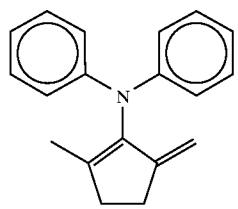

(130)  C₃H₇  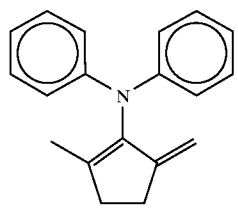

The cyanine dye can be synthesized by referring to the descriptions of Japanese Patent Provisional Publication No. 62(1987)-123252, 3(1991)-226736, 5(1993)-313305, 6(1994)-43583, Japanese Patent Application No. 7(1995)-269097 and European Patent No. 0430244A.

The cyanine dye may be subjected to lake formation. A preferred lake cyanine dye is represented by the formula (II):

$$(D)\text{—}A_m \cdot Y_n \qquad (II)$$

In the formula (II), D is a skeleton of a cyanine dye represented by the formula (Ia);

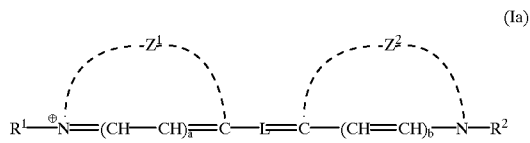

(Ia)

In the formula (Ia), each of $Z^1$ and $Z^2$ independently is a non-metallic atomic group that forms a five-membered or six-membered nitrogen-containing heterocyclic ring, which may be condensed with another ring; each of $R^1$ and $R^2$ independently is an alkyl group, an alkenyl group or an aralkyl group; L is a linking group having conjugated double bonds formed by a combination of five, seven or nine methine groups; and each of a and b independently is 0 or 1.

In the formula (Ia), $Z^1$, $Z^2$, $R^1$, $R^2$, L, a and b have the same meanings as $Z^1$, $Z^2$, $R^1$, $R^2$, L, a and b in the formula (I).

In the formula (II), A is a charged anionic group that is attached to D as a substituent group. Examples of the anionic groups include carboxyl, sulfo, phenolic hydroxide, a sulfonamido group, sulfamoyl and phosphono. Carboxyl, sulfo and a sulfonamido group are preferred. Carboxyl is particularly preferred.

In the formula (II), Y is a cation, which relates to the lake formation of the cyanine dye Examples of inorganic cations include alkaline earth metal ions (e.g., $Mg^{2+}$, $Ca^{2+}$, $Ba^{2+}$, $Sr^{2+}$), transition metal ions (e.g., $Ag^+$, $Zn^{2+}$) and other metal ions (e.g., $Al^{3+}$), samples of organic cations include ammonium ion, amidinium ion and guanidium ion. The organic cation preferably has 4 or more carbon atoms. A divalent or trivalent cation is preferred.

In the formula (II), m is an integer of 2 to 5, and preferably is 2, 3 or 4.

In the formula (II), n is an integer of 1 to 5 that is required for a charge balance. Usually, n is 1, 2 or 3.

The lake cyanine dye may be in the form of a complex salt.

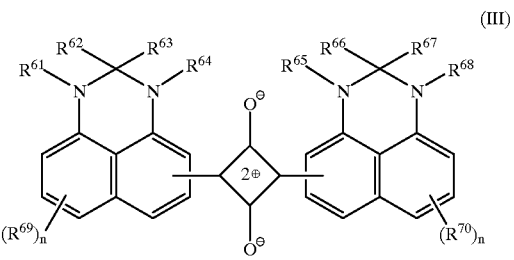

(III)

in which each of $R^{61}$, $R^{62}$, $R^{63}$, $R^{64}$, $R^{65}$, $R^{66}$, $R^{67}$ and $R^{68}$ independently is hydrogen, an alkyl group, a cycloalkyl group, an aryl group, an aralkyl group or a heterocyclic group; $R^{61}$ and $R^{62}$, $R^{63}$ and $R^{64}$, $R^{65}$ and $R^{66}$, $R^{67}$ and $R^{68}$, $R^{62}$ and $R^{63}$, or $R^{66}$ and $R^{67}$ may be combined to form a five- or six-membered ring; each of $R^{69}$ and $R^{70}$ independently is an alkyl group, an alkoxy group, an aryloxy group, a halogen atom, an alkoxycarbonyl group, amino, an alkyl-substituted amino group, an amido group, a sulfonamido group, cyano, nitro or carboxyl; and n is an integer of 0 to 3.

In the formula (III), the alkyl group preferably has 1 to 20 carbon atoms, more preferably has 1 to 12 carbon atoms, and most preferably has 1 to 8 carbon atoms. Examples of the alkyl groups include methyl, ethyl, propyl, butyl, hexyl and undecyl. The alkyl group may be branched. The alkyl group may have a substituent group. Examples of the substituent groups include a halogen atom (F, Cl, Br) an alkoxycarbonyl group (e.g., methoxycarbonyl, ethoxycarbonyl), hydroxy, an alkoxy group (e.g., methoxy, ethoxy, isobutoxy), an aryloxy group (e.g., phenoxy) and an acyloxy group (e.g., acetyloxy, butyryloxy, hexyryloxy, benzoyloxy).

In the formula (III), examples of the cyclohexyl groups include cyclopentyl and cyclohexyl.

In the formula (III), the aryl group preferably has 6 to 12 carbon atoms. Examples of the aryl groups include phenyl and naphthyl. The aryl group may have a substituent group. Examples of the substituent groups include an alkyl group having 1 to 8 carbon atoms (e.g., methyl, ethyl, butyl), an alkoxy group having 1 to 6 carbon atoms (e.g., Methoxy, ethoxy), an aryloxy group (e.g., phenoxy, p-chlorophenoxy), a halogen atom (F, Cl, Br), an alkoxycarbonyl group (e.g., methoxycarbonyl, ethoxycarbonyl), amino, an alkyl-substituted amino group (e.g., methylamino), an amido group (e.g., acetamido), a sulfonamido group (e.g., methanesulfonamido), cyano, nitro and carboxyl.

In the formula (III), the aralkyl group preferably has 7 to 12 carbon atoms. Examples of the aralkyl groups include benzyl and phenethyl. The aralkyl group may have a substituent group. Examples of the substituent groups include an alkyl group having 1 to 8 carbon atoms. (e.g., methyl), an alkoxy group having 1 to 6 carbon atoms (e.g., methoxy) and a halogen atom (e.g., Cl).

In the formula (III), examples of the heterocyclic groups include thienyl, furyl, pyrrolyl, pyrazolyl, pyridyl and indolyl.

In the formula (III), the alkoxy group preferably has 1 to 6 carbon atoms. Examples of the alkoxy groups include methoxy and ethoxy.

In the formula (III), the aryloxy group may have a substituent group. Examples of the substituent groups include a halogen atom (e.g., Cl). Examples of the aryloxy groups include phenoxy and p-chlorophenoxy.

In the formula (III), examples of the alkoxycarbonyl groups include methoxycarbonyl and ethoxycarbonyl.

In the formula (III), examples of the alkyl-substituted amino groups include methylamino.

In the formula (III), examples of the amido groups include acetamido.

In the formula (III), examples of the sulfonamido groups include methanesulfonamido.

Examples of the rings formed by combining $R^{61}$ and $R^{62}$, $R^{63}$ and $R^{64}$, $R^{65}$ and $R^{66}$, $R^{67}$ and $R^{63}$, $R^{62}$ and $R^{63}$, or $R^{66}$ and $R^{67}$ include cyclopentane ring and cyclohexane ring.

The position at which the squaline ring is attached to the dihydroperimidine ring preferably is the ortho position or the para position, and more preferably is the ortho position to the position at which the nitrogen atom is attached to the benzene ring of the dihydroperimidine ring Examples of the dihydroperimidine squarilium dyes represented by the formula (III) are shown below.

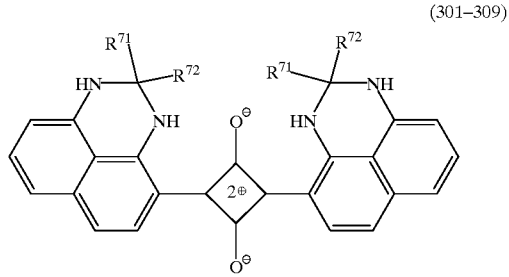

(301–309)

| | $R^{71}$ | $R^{72}$ |
|---|---|---|
| (301) | $CH_3$ | $C_{11}H_{23}$ |
| (302) | $C_2H_6$ | $C_2H_5$ |
| (303) | $C_5H_{11}$ | $C_5H_{11}$ |
| (304) | $C_2H_5$ | $C_{13}H_{27}$ |
| (305) | $CH_3$ | 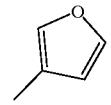 |
| (306) | $CH_3$ | phenyl |
| (307) | $CH_3$ | 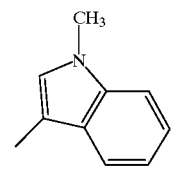 |
| (308) | $CH_3$ | 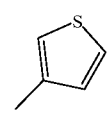 |
| (309) | $CH_2OCOC_5H_{11}$ | $CH_2OCOC_5H_{11}$ |

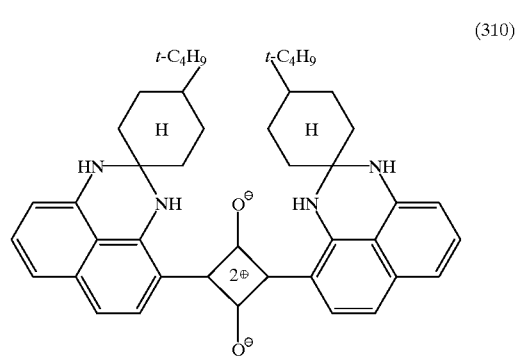

(310)

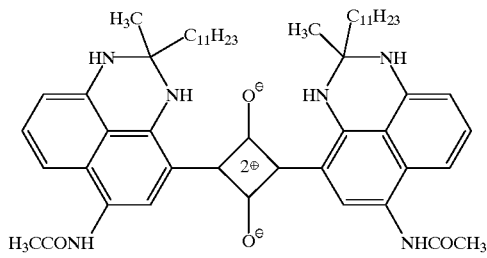

(311)

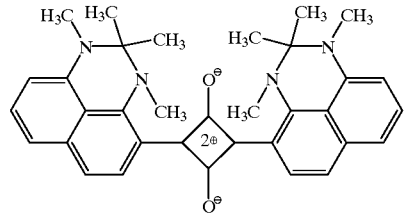

(312)

-continued

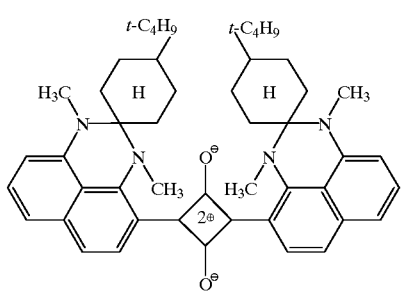
(313)

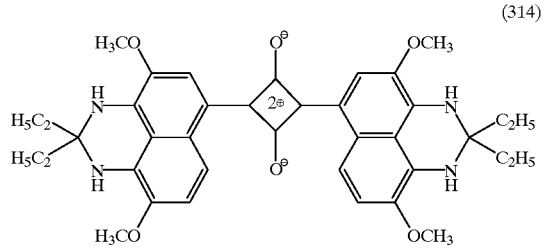
(314)

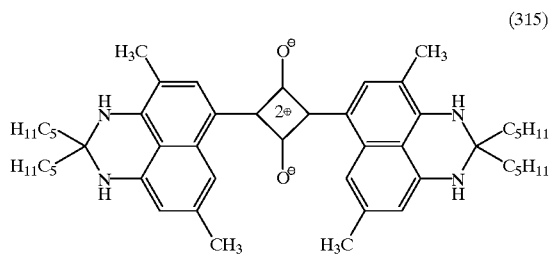
(315)

The dihydroperimidine squarilium dyes represented by the formula (III) can be synthesized by referring to the descriptions of U.S. Pat. No. 5,380,635. The synthesis example of the dye (302) is shown below. The other dihydroperimidine squarilium dyes can be synthesized in a similar manner.

SYNTHESIS EXAMPLE 1

Synthesis of the dye (302)

With 1.58 g of 1,8-diaminonaphthalene, 10.8 g of diethyl ketone and 25 mg of sodium p-toluenesulfonate monohydrate were mixed. The mixture was heated and stirred for 5 hours in a steam bath. The resulting mixture was extracted with 100 ml of ethyl acetate and 50 ml of a saturated aqueous solution of sodium hydrogencarbonate. The solvent was distilled out to obtain 20 g of 2,2-diethyl-2,3-dihydroperimidine.

With 5.4 g of 2,2-diethyl-2,3-dihydroperizmidine, 1.14 g of squaric acid, 50 ml of n-butanol and 50 ml of toluene were mixed. The mixture was heated for 5 hours while heating the vessel at 130° C. To the mixture, 20 ml of methanol was added. The precipitated crystals were filtered off. The dye (302) was separated by a column chromatography using silica gel and chloroform.

Yield: 1.2 g $\lambda$.max: 808.2 nm (acetone)
$\epsilon$: 1.68×10$^5$

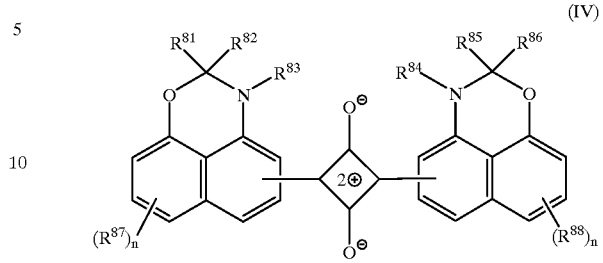
(IV)

in which each of $R^{81}$, $R^{82}$, $R^{83}$ $R^{84}$ $R^{85}$, and $R^{86}$ independently is hydrogen, an alkyl group, a cycloalkyl group, an aryl group, an aralkyl group or a heterocyclic group; $R^{81}$ and $R^{82}$ or $R^{84}$ and $R^{85}$ may be combined to form a five- or six-membered ring; each of $R^{87}$ and $R^{88}$ independently is an alkyl group, an alkoxy group, an aryloxy group, a halogen atom, an alkoxycarbonyl group, amino, an alkyl-substituted amino group, an amido group, a sulfonamido group, cyano, nitro or carboxyl; and n is an integer of 0 to 3.

In the formula (IV), the alkyl group, the cycloalkyl group, the aryl group, the aralkyl group, the heterocyclic group, the alkoxy group, the aryloxy group, the halogen atom, the alkoxycarbonyl group, the alkyl-substituted amino group, the amido group and the sulfonamido group have the same meanings as in the formula (III).

In the formula (IV), examples of the rings formed by combining $R^{81}$ and $R^{82}$ or $R^{84}$ and $R^{85}$ include cyclopentane ring and cyclohexane ring.

The position at which the squaline ring is attached to the naphthooxazinine ring preferably is the ortho position or the para position, and more preferably is the ortho position to the position at which the nitrogen atom is attached to the benzene ring of the naphthooxazinine ring.

Examples of the naphthooxazinine squarilium dyes represented by the formula (IV) are shown below.

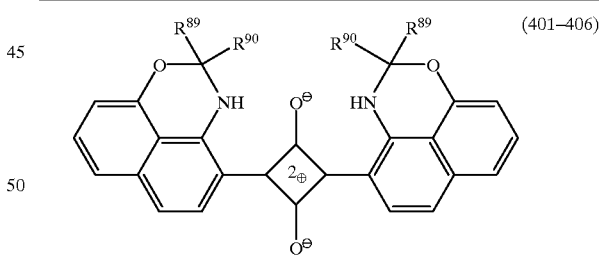
(401–406)

| | $R^{89}$ | $R^{90}$ |
|---|---|---|
| (401) | CH$_3$ | CH$_3$ |
| (402) | C$_5$H$_{11}$ | C$_5$H$_{11}$ |
| (403) | CH$_3$ | C$_{11}$H$_{23}$ |
| (404) | CH$_3$ | 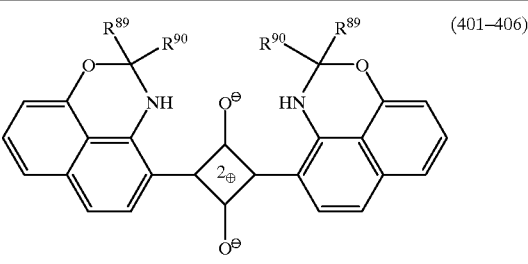 |
| (405) | CH$_3$ | phenyl |
| (406) | CH$_2$OCOC$_5$H$_{11}$ | CH$_2$OCOC$_5$H$_{11}$ |

-continued

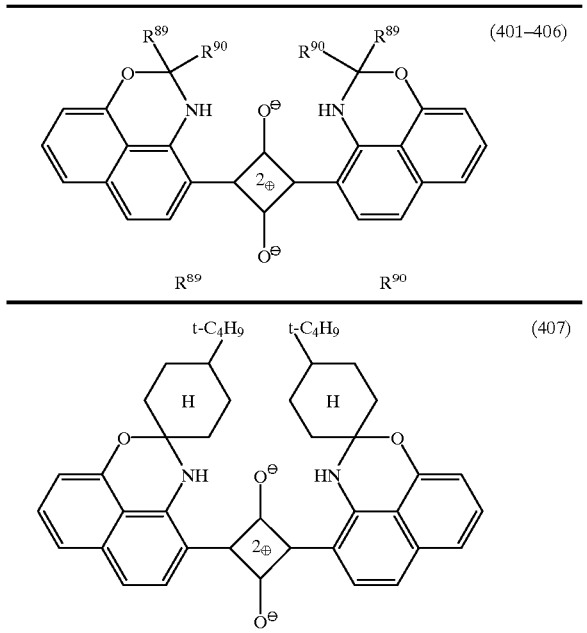

(401–406)

(407)

The synthesis example of the dye (402) is shown below. The other naphthooxazinine squarilium dyes can be synthesized in a similar manner.

SYNTHESIS EXAMPLE 2

Synthesis of the dye (402)

With 6.3 g of 8-amino-1-naphthol and 20 ml of ethanol, 8.1 g of 5-undecanone was mixed. The mixture was refluxed for 3 hours. The reaction mixture was condensed, and purified in a column chromatography (silica gel, n-hexane/ethyl acetate=1/6) to obtain 2.6 g of naphthooxazinine.

With 2.6 of naphthooxazinine, 0.5 g of 3,4-dihydroxy-3-cyclobutene-1,2-dione and 30 ml of toluene were mixed. The mixture was heated for 3 hours to remove formed water while heating the vessel at 140° C. The reaction mixture was condensed, and purified in a column chromatography (silica gel, chloroform) to obtain 0.6 g of the dye (402).

λmax: 781.1 nm (CHCl$_3$)

ε: 1.69×10$^5$ m.p.: 193–195° C.

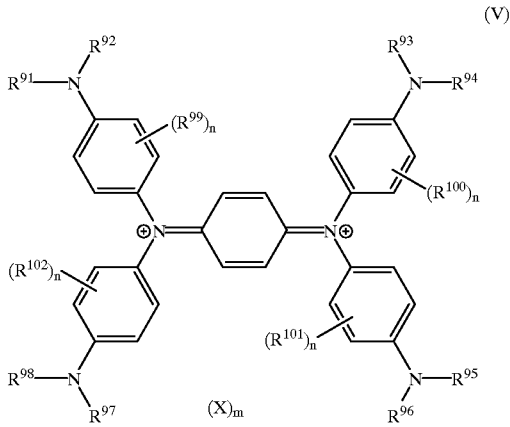

(V)

in which each of $R^{91}$, $R^{92}$, $R^{93}$, $R^{94}$, $R^{95}$, $R^{96}$, $R^{97}$ and $R^{98}$ independently is hydrogen, an alkyl group, a cycloalkyl, group, an aryl group, an aralkyl group or a heterocyclic group; $R^{99}$, $R^{100}$, $R^{101}$ and $R^{102}$ independently is an alkyl group, an alkoxy group, an aryloxy group, a halogen atom, an alkoxycarbonyl group, amino, an alkyl-substituted amino group, an amido group, a sulfonamido group, cyano, nitro or carboxyl; or $R^{91}$ and $R^{92}$, $R^{93}$ and $R^{94}$, $R^{95}$ and $R^{96}$, $R^{97}$ and $R^{98}$, $R^{91}$ and $R^{99}$, $R^{92}$ and $R^{99}$, $R^{93}$ and $R^{100}$, $R^{94}$ and $R^{100}$, $R^{95}$ and $R^{101}$, $R^{96}$ and $R^{101}$, $R^{97}$ and $R^{102}$ or $R^{98}$ and $R^{102}$ may be combined to form a five- or six-membered ring; n is an integer of 0 to 3; X is an anion or cation required for neutralizing electric charge in the molecule; and m is an integer of 0 to 6.

In the formula (V), the alkyl group preferably has 1 to 20 carbon atoms, more preferably has 1 to 12 carbon atoms, and most preferably has 1 to 8 carbon atoms. Examples of the alkyl groups include methyl, ethyl, propyl, butyl, hexyl and undecyl. The alkyl group may be branched. The alkyl group may have a substituent group. Examples of the substituent groups include a halogen atom (F, Cl, Br), an alkoxycarbonyl group (e.g., methoxycarbonyl, ethoxycarbonyl), hydroxy, an alkoxy group (e.g., methoxy, ethoxy, isobutoxy), an aryloxy group (e.g., phenoxy), an acyloxy group (e.g., acetyloxy, butyryloxy, hexyryloxy, benzoyloxy), carboxyl and sulfo.

In the formula (V), examples of the cyclohexyl groups include cyclopentyl and cyclohexyl.

In the formula (V), the aryl group preferably has 6 to 12 carbon atoms. Examples of the aryl groups include phenyl and naphthyl. The aryl group may have a substituent group. Examples of the substituent groups include an alkyl group having 1 to 8 carbon atoms (e.g., methyl, ethyl, butyl), an alkoxy group having 1 to 6 carbon atoms (e.g., methoxy, ethoxy), an aryloxy group (e.g., phenoxy, p-chlorophenoxy), a halogen atom (F, Cl, Br), an alkoxycarbonyl group (e.g., methoxycarbonyl, ethoxycarbonyl), amino, an alkyl-substituted amino group (e.g., methylamino), an amido group (e.g., acetamido), a sulfonamido group (e.g., methanesulfonamido), cyano, nitro, carboxyl and sulfo.

In the formula (V), the aralkyl group preferably has 7 to 12 carbon atoms. Examples of the aralkyl groups include benzyl and phenethyl. The aralkyl group may have a substituent group. Examples of the substituent groups include an alkyl group having 1 to 8 carbon atoms (e.g., methyl), an alkoxy group having 1 to 6 carbon atoms (e.g., methoxy), a halogen atom (e.g., Cl), carboxyl and sulfo In the formula (V), examples of the heterocyclic groups include thienyl, furyl, pyrrolyl, pyrazolyl, pyridyl and indolyl.

In the formula (V), the alkoxy group preferably has 1 to 6 carbon atoms. Examples of the alkoxy groups include methoxy and ethoxy, In the formula (V), the aryloxy group may have a substituent group. Examples of the substituent groups include a halogen atom (e.g., Cl). Examples of the aryloxy groups include phenoxy and p-chlorophenoxy.

In the formula (V), examples of the alkoxycarbonyl groups include methoxycarbonyl and ethoxycarbonyl.

In the formula (V), examples of the alkyl-substituted amino groups include methylamino.

In the formula (V), examples of the amido groups include acetamido.

In the formula (V), examples of the sulfonamido groups include methanesulfonamido.

Examples of the rings formed by combining $R^{91}$ and $R^{92}$, $R^{93}$ and $R^{94}$, $R^{95}$ and $R^{96}$ or $R^{97}$ and $R^{98}$ include piperazine ring, piperidine ring, morpholine ring and pyrrolidine ring. Examples of the rings formed by combining $R^{91}$ and $R^{99}$, $R^{92}$ and $R^{99}$, $R^{93}$ and $R^{100}$, $R^{94}$ and $R^{100}$, $R^{95}$ and $R^{101}$, $R^{96}$ and $R^{101}$, $R^{97}$ and $R^{102}$ or $R^{98}$ and $R^{102}$ include julolidine ring and tetrahydroquinoline ring. In the case that $R^{99}$, $R^{100}$, $R^{101}$ or $R^{102}$ is combined with $R^{91}$, $R^{92}$, $R^{93}$, $R^{94}$, $R^{95}$, $R^{96}$, $R^{97}$ or $R^{98}$ to form a ring, the position of $R^{99}$, $R^{100}$, $R^{101}$ or $R^{102}$ preferably is adjacent to the position of $R^{91}$, $R^{92}$, $R^{93}$, $R^{94}$, $R^{95}$, $R^{96}$, $R^{97}$ or $R^{98}$.

In the formula (V), examples of anions represented by X include a halide ion (Cl⁻, Br⁻, I⁻), p-toluenesulfonate ion, ethylsulfate ion, $PF_6^-$, $BF_4^-$ and $ClO_4^-$. In the case that the molecule of the compound has two carboxyl or sulfo groups, m is 0. In the case that the molecule of the compound has three or more carboxyl of sulfo groups, X should be cation. Examples of the cations include an alkali metal ion (e.g., sodium ion, potassium ion, lithium ion), ammonium ion (e.g., triethylammonium ion) and pyridinium ion.

Examples of the diiminium dyes represented by the formula (V) are shown below.

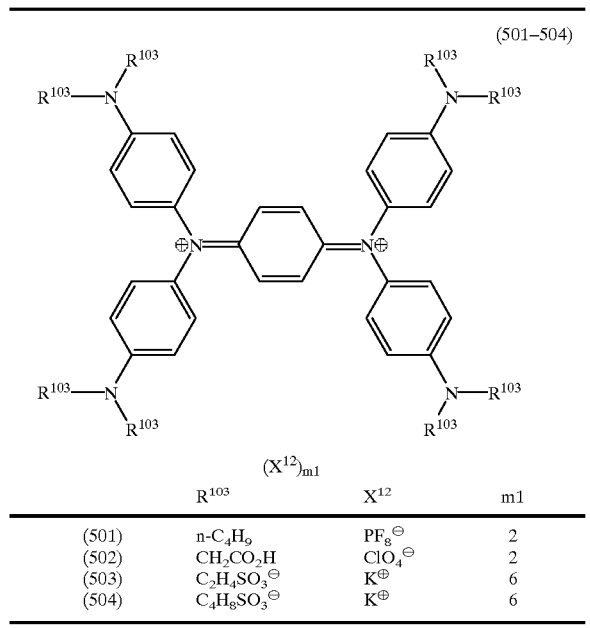

| | $R^{103}$ | $X^{12}$ | m1 |
|---|---|---|---|
| (501) | n-$C_4H_9$ | $PF_8^{\ominus}$ | 2 |
| (502) | $CH_2CO_2H$ | $ClO_4^{\ominus}$ | 2 |
| (503) | $C_2H_4SO_3^{\ominus}$ | $K^{\oplus}$ | 6 |
| (504) | $C_4H_8SO_3^{\ominus}$ | $K^{\oplus}$ | 6 |

The diiminium dyes represented by the formula (V) can be sythesized by ref erring to the descriptions in Japanese Patent Publication No. 43(1968)-25335.

(VI)

in which each of $R^{110}$, $R^{111}$, $R^{112}$, $R^{114}$, $R^{115}$, $R^{116}$ and $R^{117}$ independently hydrogen is an alkyl group, a cycloalkyl group, an aryl group or an aralkyl,group; $R^{118}$, $R^{119}$, $R^{120}$ and $R^{121}$ independently is an alkyl group, an alkoxy group, an aryloxy group, a halogen atom, an alkoxycarbonyl group, amino, an alkyl-substituted amino group, an amido group, a sulfonamido group, cyano, nitro or carboxyl; or $R^{110}$ and $R^{111}$, $R^{112}$ and $R^{113}$, $R^{114}$ and $R^{115}$, $R^{116}$ and $R^{117}$, $R^{110}$ and $R^{118}$, $R^{111}$ and $R^{118}$, $R^{112}$ and $R^{119}$, $R^{113}$ and $R^{119}$, $R^{114}$ and $R^{120}$, $R^{115}$ and $R^{120}$, $R^{116}$ and $R^{121}$ or $R^{117}$ and $R^{121}$ may be combined to form a five- or six-membered ring; $L^{14}$ is trimethine or pentamethine; n is an integer of 0 to 3; X is an anion or cation required for neutralizing electric charge in the molecule; and m is an integer of 0 to 6.

In the formula (VI), the alkyl group, the cycloalkyl group, the aryl group, the aralkyl group, the alkoxy group, the aryloxy group, the halogen atom, the alkoxycarbonyl group, the alkyl-substituted amino group, the amido group and the sulfonamido group have the same meanings as in the formula (VI).

Examples of the rings formed by combining $R^{110}$ and $R^{111}$, $R^{112}$ and $R^{113}$, $R^{114}$ and $R^{115}$ or $R^{116}$ and $R^{117}$ include piperazine ring, pipetidine ring, morpholine ring and pyrrolidine ring. Examples of the rings formed by combining $R^{110}$ and $R^{118}$, $R^{111}$ and $R^{118}$, $R^{112}$ and $R^{119}$, $R^{113}$ and $R^{119}$, $R^{114}$ and $R^{120}$, $R^{115}$ and $R^{120}$, $R^{116}$ and $R^{121}$ or $R^{117}$ and $R^{121}$ include julolidine ring and tetrahydroquinoline ring. In the case that $R^{118}$, $R^{119}$, $R^{120}$ or $R^{121}$ is combined with $R^{110}$, $R^{111}$, $R^{112}$, $R^{113}$, $R^{114}$, $R^{115}$, $R^{116}$ or $R^{117}$ to form a ring, the position of $R^{118}$, $R^{119}$, $R^{120}$ or $R^{121}$ preferably is adjacent to the position of $R^{110}$, $R_{111}$, $R^{112}$, $R^{113}$, $R^{114}$, $R^{115}$, $R^{116}$ or $R^{117}$.

The methine of $L^{14}$ may have a substituent group. Examples of the substituent groups are the same as the substituent groups of L in the formula (I).

In the formula (VI), X and m have the same meanings as in the formula (V).

Examples of the polymethine dyes represented by the formula (VI) are shown below.

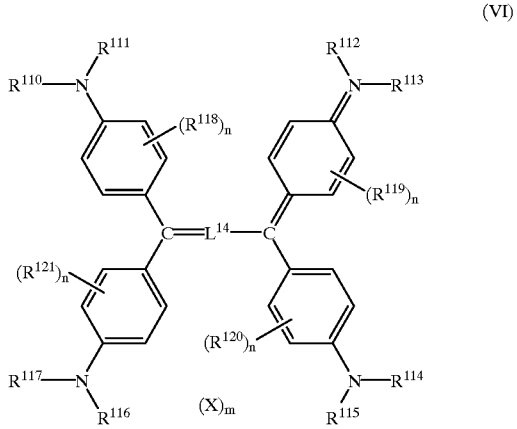

| | $R^{122}$ | n | $X^{13}$ | m2 |
|---|---|---|---|---|
| (601) | $C_2H_9$ | 1 | $PF_6^{\ominus}$ | 1 |
| (602) | $C_2H_9$ | 2 | $PF_6^{\ominus}$ | 1 |
| (603) | $CH_2CO_2H$ | 1 | $ClO_4^{\ominus}$ | 1 |
| (604) | $C_4H_8SO_3^{\oplus}$ | 2 | $K^{\oplus}$ | 7 |

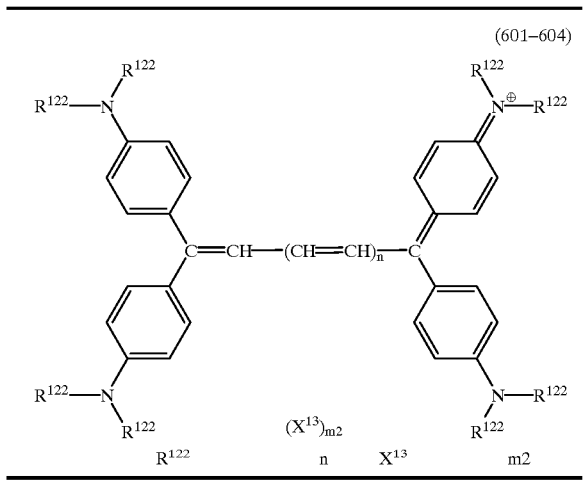

(601-604)

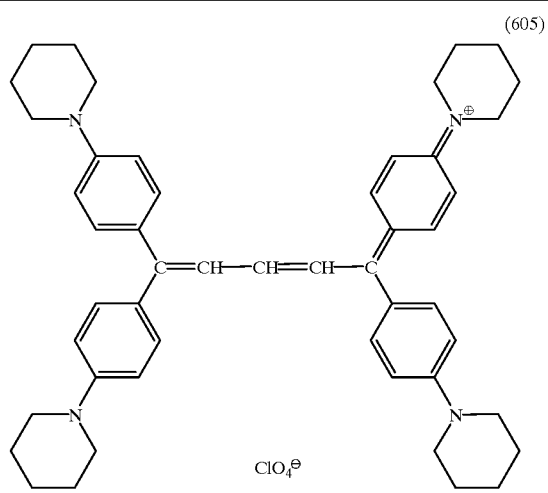

(605)

The polymethine dyes represented by the formula (VI) can be synthesized by referring to the descriptions in J. Am. Chem. Soc., 80, 3772–3777 (1958).

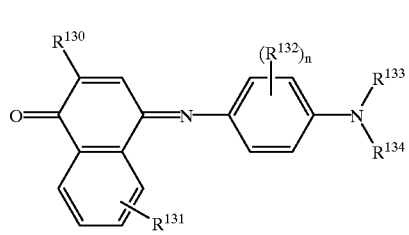

(VII)

in which $R^{130}$ is hydrogen, a halogen atom, carboxyl, sulfo, $R^{135}$—NHCO—, $R^{135}$—NHSO$_2$—, $R^{135}$—SO$_2$NH—, $R^{135}$—CONH— or $R^{135}$—NHCONH—; $R^{131}$ is hydrogen, an alkyl group, $R^{136}$—SO$_2$—NH— or $R^{136}$—CONH—; each of $R^{135}$ and $R^{136}$ independently is an alkyl group, an aryl group or a heterocyclic group; $R^{132}$ is an alkyl group, an alkoxy group, an aryloxy group, hydroxy, amino, an alkyl-substituted amino group, an amido group, a sulfonamido group or a halogen atom; n is an integer of 0 to 3; each of $R^{133}$ and $R^{134}$ independently is an alkyl group, an aryl group or an aralkyl group; and $R^{132}$ and $R^{133}$, $R^{133}$ and $R^{134}$ or $R^{135}$ and $R^{134}$ may be combined to form five- or six-membered ring.

In the formula (VII), the alkyl group, the aryl group and the aralkyl group have the same meanings as in the formula (V).

In the formula (VII), examples of the heterocyclic rings of the heterocyclic groups include pyridine ring, 1,3-thiazole ring, 1,3,4-triazole ring, benzothiazole ring, benzimidazole ring, benzoxazole ring and 1,2,4-thiadiazole ring.

In the formula (VII), the halogen atoms include F, Br and Cl.

In the formula (VII), examples of the alkoxy groups include methoxy, ethoxy and isobutoxy.

In the formula (VII), examples of the aryloxy groups include phenoxy.

In the formula (VII), examples of the alkyl-substituted amino groups include methylamino.

In the formula (VII), examples of the amido groups include acetamido.

In the formula (VII), examples of the sulfonamido groups include methanesulfonamido.

In the formula (VII), examples of the rings formed by combining $R^{133}$ and $R^{134}$ include piperazine ring, piperidine ring, morpholine ring and pyrrolidine ring. Examples of the rings formed by combining $R^{132}$ and $R^{133}$ or $R^{132}$ and $R^{134}$ include julolidine ring and tetrahydroquinoline ring.

Examples of the azomethine dyes represented by the formula (VII) are shown below.

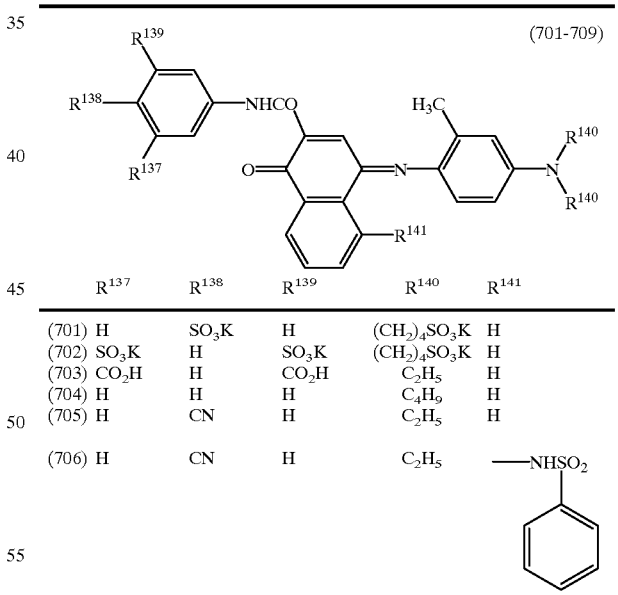

(701-709)

| | $R^{137}$ | $R^{138}$ | $R^{139}$ | $R^{140}$ | $R^{141}$ |
|---|---|---|---|---|---|
| (701) | H | SO$_3$K | H | (CH$_2$)$_4$SO$_3$K | H |
| (702) | SO$_3$K | H | SO$_3$K | (CH$_2$)$_4$SO$_3$K | H |
| (703) | CO$_2$H | H | CO$_2$H | C$_2$H$_5$ | H |
| (704) | H | H | H | C$_4$H$_9$ | H |
| (705) | H | CN | H | C$_2$H$_5$ | H |
| (706) | H | CN | H | C$_2$H$_5$ | —NHSO$_2$— 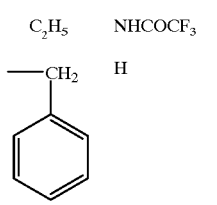 |
| (707) | H | CN | H | C$_2$H$_5$ | NHCOCF$_3$ |
| (708) | H | CN | H | —CH$_2$— 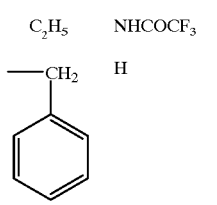 | H |

| | | | | |
|---|---|---|---|---|
| (709) | H | CO₂H | H | C₂H₅ |

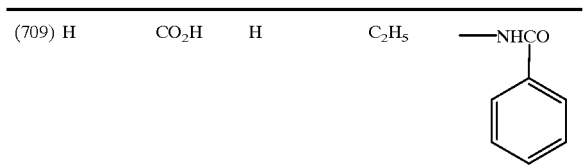

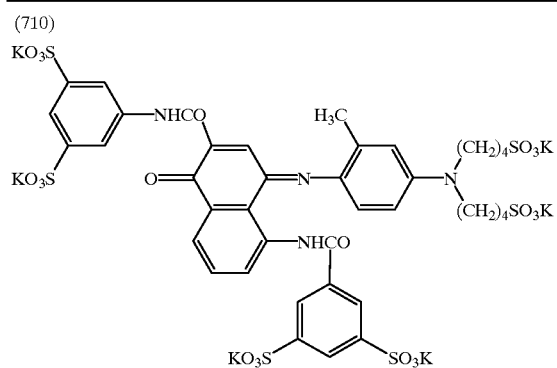

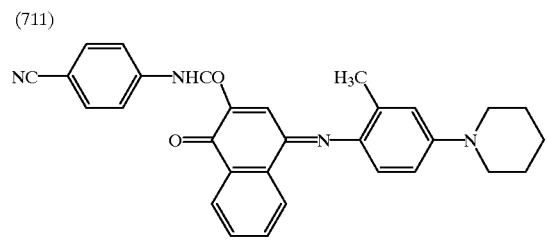

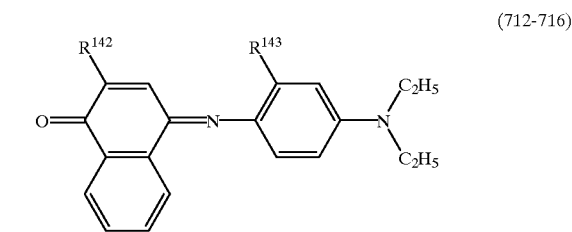

| | R₁₄₂ | R₁₄₃ |
|---|---|---|
| (712) | 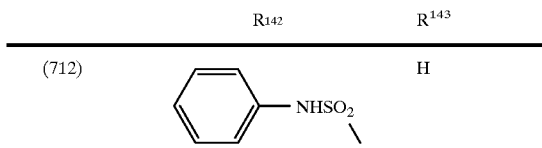 | H |
| (713) | 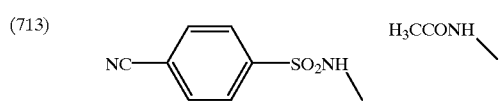 | H₃CCONH\ |
| (714) |  | H₃CO |
| (715) | 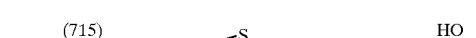 | HO |
| (716) | 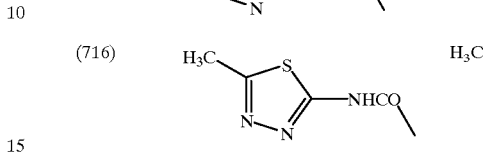 | H₃C |

The azomethine dyes represented by the formula (VII) can be synthesized by referring to the descriptions in Japanese Patent Provisional Publication Nos. 5(1993)-323500 and 5(1993)-323501.

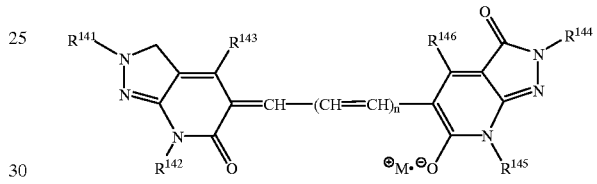

(VIII)

in which each of $R^{141}$ and $R^{142}$ independently is hydrogen, an alkyl group, an aryl group or a heterocyclic group; each of $R^{142}$ and $R^{145}$ independently is hydrogen, an alkyl group, an aryl group, a heterocyclic group, —COR$^{147}$ or —SO2R$^{147}$; $R^{147}$ is an alkyl group or an aryl group; each of $R^{143}$ and $R^{146}$ independently is hydrogen, cyano, an alkyl group, an aryl group, —COOR$^{149}$, —OR$^{149}$, —NR$^{149}$R$^{150}$, —N(R$^{149}$)COR$^{148}$, —CONR$^{148}$R$^{149}$ or —N(R$^{149}$)CONR$^{150}$R$^{151}$; $R^{148}$ is an alkyl group or an aryl group; each of $R^{149}$, $R^{150}$ and $R^{151}$ independently is hydrogen, an alkyl group or an aryl group; n is 1 or 2; and M is hydrogen or a monovalent cation.

In the formula (VIII), the alkyl group and the aryl group have the same meanings as in the formula (V).

In the formula (VIII), the heterocyclic group have the same meanings as in the formula (VII).

In the formula (VIII), examples of the monovalent cations include an alkali metal ion (e.g., sodium ion, potassium ion, lithium ion), ammonium ion (e.g., triethylammonium ion) and pyridinium ion.

Examples of the oxonol dyes represented by the formula (VIII) are shown below.

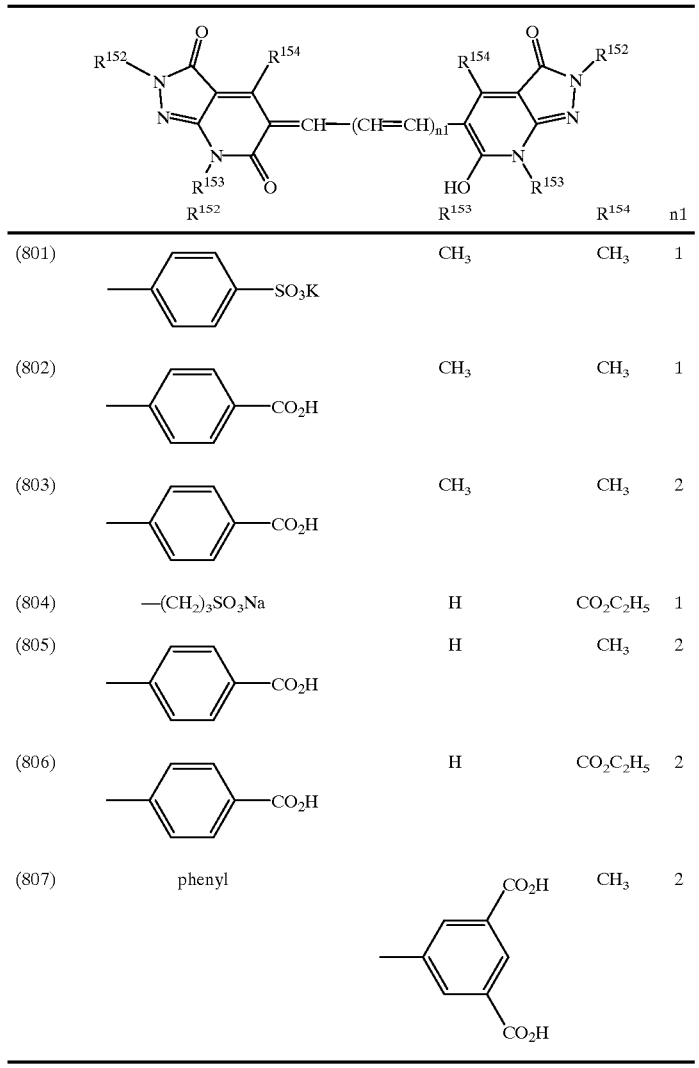

The oxonol dyes represented by the formula (VIII) can be synthesized by referring to the descriptions in Japanese Patent Publication Nos. 39(1964)-22069, 43(1968)-3504 and 54(1979)-38129.

The other examples of the infrared absorbing dyes are shown below.

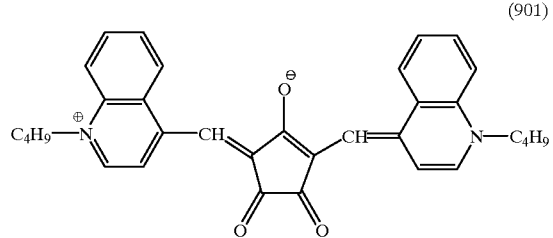

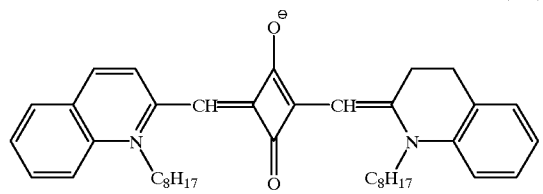

Two or more infrared absorbing dye can be used in combination.

A solution of the infrared absorbing dye can be added to the coating solution of an infrared absorbing layer. Examples of the solvents include water, an alcohol, methylcellosolve, DMF, dichloromethane, acetone and ethyl acetate. The infrared absorbing dye is preferably used in the form of solid fine particle dispersion, which is added to the coating solution of the infrared absorbing layer. The solid fine particle dispersion of a dye is described in Japanese Patent Provisional Publication Nos. 2(1990)-282244, 3(1991)-138640 and Japanese Patent No. 7(1995)-269097.

The solid fine particles can be prepared by using a conventional dispersing device. Examples of the conventional devices include ball mills, sand mills, colloid mills, vibration ball mills, planet ball mills, jet mills, roll mills, mantongaurins, microfluidizers and deskimpeller mills. The dispersing devices are described in Japanese Patent Provisional Publication No. 52(1977)-92716 and International Patent Publication No. 88/074794. Longitudinal or lateral dispersing devices can be used.

The particles can be dispersed in a medium (e.g., water, alcohol). A dispersing surface active agent is preferably added to the medium. An anionic surface active agent is preferably used. Preferred anionic surface active agents are described in Japanese Patent Provisional Publication No. 52(1977)-92716 and international Patent Publication No. 88/04794. If necessary, an anionic polymer, a nonionic surface active agent or a cationic surface active agent can be used in place of the anionic surface active agent. Further, a hydrophilic polymer (e.g., cellulose polymer) can be added to the dispersing medium.

The particles in the form of fine powder can be formed by dissolving the infrared ray absorbing colorant in a solvent and adding a bad solvent to the solution. In this case, the above-mentioned dispersing surface active agent can also be added to the solvent. Further, the particles can be formed by dissolving the colorant in a solvent at a controlled pH and adjusting the pH to precipitate fine crystals of the colorant.

In the case that a lake dye is used, a dye corresponding to (D)-$A_m$ in the formula (II) is dissolved in a solvent, and a water soluble salt of a cation corresponding to Y in the formula (II) is added to the solution to precipitate fine crystals of the lake dye.

The coating amount of the infrared absorbing dye is preferably in the range of 1 mg per $m^2$ to 10.0 g per $m^2$, and more preferably in the range of 10 mg per $m^2$ to 5.0 g per $m^2$.

The infrared absorbing layer preferably contains a binder.

In the first embodiment of the present invention, the infrared absorbing dye preferably has a function as a hard coating layer, which increases the adhesion between the transparent support and the low refractive index layer or the high refractive index layer. Therefore, the infrared absorbing layer preferably contains an adhesive polymer or compound as the binder. Examples of the adhesive polymers and compounds include acrylic polymers, urethane polymers, epoxy polymers and silica compounds.

In the second embodiment of the invention, there is no specific limitation with respect to the binder of the infrared absorbing layer. In the case that the infrared absorbing layer functions as an adhesive layer, which increases the adhesion between the surface board of the plasma display (41 shown in FIG. 4) and the transparent support of the anti-reflection film, the infrared absorbing layer preferably contains an adhesive polymer or compound as the binder in the same manner as in the first embodiment.

In the case that a polymer (e.g., cellulose polymer) is added to a dispersing medium of solid fine particles of an infrared absorbing dye, the added polymer can function as the binder of the infrared absorbing layer.

The thickness of the infrared absorbing layer (total thickness in the case of two or more infrared absorbing layers) is preferably in the range of 0.5 to 54 μm, more preferably in the range of 0.5 to 20 μm, and most preferably in the range of 0.5 to 10 μm.

Low refractive index layer

The low refractive index layer has a refractive index of not higher than 1.45. The refractive index preferably is not higher than 1.40, more preferably not higher than 1.38, and most preferably not higher than 1.35. The refractive index is preferably higher than 1.29.

The low refractive index layer preferably contains a fluoropolymer. Fluorine atom has low polarization. The polarization of the bond of carbon to fluorine is the lowest value among bonds between various atoms. Accordingly, the fluoropolymer is advantageously used to reduce the refractive index of a layer.

The fluoropolymer can be obtained by polymerization of monomers containing fluorine atom. Examples of the monomers include fluoroolefins (e.g., fluoroethylene, vinylidene fluoride, tetrafluoroethylene, hexafluoropropylene, perfluoro-2,2-dimethyl-1,3-dioxonol), completely or partially fluorinated alkyl acrylates or methacrylates and completely or partially fluorinated vinyl ethers. The fluorinated alkyl acrylates or methacrylates are preferred. Accordingly, the polymers containing fluorine atoms preferably comprises the repeating units represented by the formula (X):

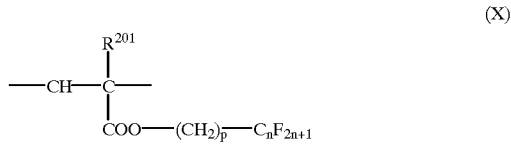

in which $R^{201}$ is hydrogen, methyl or a fluorine atom, and each of p and n independently is an integer.

The polymer may comprise repeating units containing no fluorine atom. The repeating unit is obtained by polymerizing a monomer containing no fluorine atom. Examples of the monomers include olefins (e.g., ethylene, propylene, isoprene, vinyl chloride, vinylidene chloride), acrylic esters (e.g., methyl acrylate, ethyl acrylate, 2-ethylhexyl acrylate), methacrylic esters (e.g., methyl methacrylate, ethyl methacrylate, butyl methacrylate), styrene, styrene derivatives (e.g., vinyl toluene, α-methylstyrene), vinyl ethers (e.g., methyl vinyl ether), vinyl esters (e.g., vinyl acetate, vinyl propionate), acrylamides (e.g., N-tert-butylacrylamide, N-cyclohexylacrylamide), methacrylamides and acrylonitriles.

The refractive index decreases by increasing the amount of fluorine atoms. The polymer of the low refractive index layer preferably contains fluorine atoms in an amount of 35 to 75 wt. %, more preferably in an amount of 45 to 75 wt. %.

The low refractive index layer can be formed by coating. The polymer in the coating solution can be in the form of a latex, a uniform solution or an emulsion. The latex is a fine aqueous dispersion of the polymer, which is synthesized by an emulsion polymerization method. The uniform solution can be obtained by a solution polymerization method conducted in an organic solvent. The solution can also be obtained by dissolving polymer particles in an organic solvent. The emulsion can be obtained by dispersing polymer particles in water. The polymer particles can be synthesized by a bulk polymerization method, a precipitation polymerization method, a suspension polymerization method or a dispersion polymerization method.

A polymer solution is preferably used to form a uniform coating layer. On the other hand, a latex is preferably used to protect environment. Further, the latex is advantageously used to control the conditions of the formed layer. In more detail, micro voids can be formed in the layer by coating the latex and fusing micro polymer particles contained in the latex. The micro polymer particles are superposed upon each other to form micro voids surrounded by the particles. The micro void can also be formed in the particles. Air introduced into the micro voids decreases the refractive index of the layer. Accordingly, the low refractive index layer is preferably i the form of a void membrane.

The refractive index of the void membrane is decreased by particles in a latex. The micro voids are preferably formed uniformly in void size and in interval. The size of the voids are preferably so adjusted that voids do not scatter light. The low refractive index layer is a porous membrane containing micro voids on a microscopic scale, but also is a uniform membrane in a macroscopic or optical scale. The macroscopic refractive index of the micro void membrane can be decreased by increasing the volume of the air, which is introduced by using the polymer in the form of micro particles. The refractive index of the micro void membrane is the volume average of the refractive index of the binder forming the membrane (larger than 1) and the refractive index of the introduced air (1.00). Accordingly, the refractive index of the micro void membrane is lower than the binder.

The mean particle size of the fluororesin particles generally is in the range of 5 to 200 nm, and preferably in the range of 10 to 70 nm. A latex containing the fine particles is commercially available.

The refractive index of the layer is decreased by increasing the volume of the micro voids. The low refractive index layer preferably contains micro voids in an amount of 3 to 50 volume %, and more preferably 5 to 35 volume %.

The polymer particles include crystal particles and glass particles. The difference is determined by the relation between the glass transition temperature (Tg) of the polymer and the temperature of forming the membrane.

The glass transition temperature is preferably higher than the temperature of forming the membrane to keep voids formed in the membrane. On the other hand, it is difficult to form a continuous membrane where the glass transition temperature is preferably higher than the temperature of forming the membrane because the particles are not fused with each other. If the continuous membrane it not formed, the mechanical strength of the layer is degraded. Accordingly, the glass transition temperature of the polymer should be determined by the above-mentioned conditions.

Two or more fluoropolymers can be used in combination. A fluoropolymer can be used in combination with polymers containing no fluorine atoms, which include a water-soluble polymer and a water-insoluble polymer. The polymers containing no fluorine atoms can be synthesized according to a conventional method. The particles are preferably formed by the fluoropolymers, and the polymers containing no fluorine atoms are preferably used as a binder.

The glass transition temperature of the polymer of the particles preferably is higher than the glass transition temperature of the binder polymer. The difference between the glass transition temperatures preferably is not smaller than 5° C., more preferably is not smaller than 20° C.

The binder polymer is cross-linked to increase the mechanical strength of the low refractive index layer. The cross-linking bond can be introduced by using monomers having a cross-linkable groups. The cross-linking reaction is conducted by irradiating light or electron beam to the low refractive index layer after forming the layer. The binder polymers are preferably cross-linked to each other or to the polymers of the particles. Examples of the cross-linkable reactive groups include isocyanate, blocked isocyanate, epoxy, aziridine, oxazoline, aldehyde, carbonyl, hydrazine, carboxyl, methylol, active methylene, vinylsulfonic acid, acid anhydride, cyanoacrylate, melamine, methylol ether, ester and urethane. The active group may be formed after a decomposition reaction, such as the blocked isocyanate. In place of introducing the cross-linkable reactive group into the binder, a compound having a cross-linkable reactive group (a cross-linking agent) can be used in combination with a binder. Two or more cross-linkable reactive groups or compounds can be used in combination. The cross-linking agent usually has two or more cross-linkable reactive groups (e.g., vinyl, active methylene).

The low refractive index layer has a thickness preferably in the range of 50 to 200 $\mu$m, more preferably in the range of 70 to 120 $\mu$m, and most preferably in the range of 80 to 100 $\mu$m.

As is shown in 35 of FIG. 3 or 46 of FIG. 4, the low refractive index layer is the surface layer of the anti-reflection film.

The surface of the low refractive index layer can be subjected to an anti-glare treatment to scatter an incident light on the surface, which displays a background view on the surface. The anti-glare treatment can be conducted by forming unevenness on the surface, which is formed by coating a layer containing inorganic or organic particles.

The low refractive index layer has a function of decreasing a surface average reflectance of the film to not higher than 1% within the visible region of 400 to 800 nm. The surface average reflectance is preferably not higher than 0.5%, more preferably not higher than 0.2%, and most preferably not higher than 0.1%. The surface maximum reflectance with in the visible region of 400 to 800 nm is preferably not higher than 10%, more preferably not higher than 5%, further preferably not higher than 2%, and most preferably not higher than 1%.

Transparent support

The transparent support is generally made of a transparent polymer (plastic) film. Examples of the polymers include cellulose derivatives (e.g., cellulose diacetate, cellulose triacetate, cellulose propionate, cellulose butyrate, cellulose acetate propionate), polyamides, polycarbonates, polyesters (e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate), polystyrene, polyolefins (e.g., polypropylene, polyethylene, polymethylpentene), polymethyl methacrylate, syndiotactic polystyrene, polysulfone, polyethersulfone, polyarylate, polyether ketone, polyether imide and polyoxyethylene. Polyesters are described in Japanese Patent Publication No. 48(1973)-40414.

The transparent support has a thickness preferably in the range of 60 to 300 $\mu$m, more preferably in the range of 70 to 200 $\mu$m, and most preferably in the range of 75 to 190 $\mu$m.

The transparent support may have another function of shielding electromagnetic wave. For example, indium tin oxide (ITO) is evaporated onto the support to obtain the function of shielding electromagnetic wave.

High refractive index layer

A high refractive index layer is preferably provided between the transparent support and the low refractive index layer.

The refractive index of the layer is not lower than 1.6, preferably not lower than 1.64, more preferably not lower than 1.70, and most preferably not lower than 1.95. The refractive index is preferably not higher than 2.80.

Examples of materials for forming a high refractive index layer having higher refractive index include organic materials such as thermoplastic resins (e.g., polystyrene, copolymers of styrene and other monomer polymerizable with styrene, polymer having an aromatic group, a heterocyclic group or a cycloalkyl or cycloalkenyl other than polystyrene, and polymers having a halogen atom other than fluorine atom), thermosetting resins (e.g., compositions containing as a hardener melamine resin, phenol resin or epoxy resin, compositions for forming polyurethane (e.g., combination of heterocyclic or aromatic polyisocyanate and polyol), and radical curable compositions containing resin or prepolymer modified by introducing a group having double bond into the above polymer or resin. The materials preferably have high film forming properties.

The high refractive index layer can be formed by using inorganic particles dispersed in an organic material. In this case, an organic material having a refractive index lower than the above materials can be employed because the inorganic particles generally have high refractive index.

Naturally, the combination of inorganic particles and organic material enables the formation of layer having refractive index higher than that of layer of the above organic material. Any organic materials are employable in the combination so long as they have transparence and are capable of dispersing the inorganic particles. Examples of the organic materials include the above materials, vinyl resins, acrylic resins, polyesters, alkyd resins, cellulose derivatives, urethane resins, and silicon compound substituted with an organic group; and hardeners used together with these resins.

The silicon compounds are generally compounds represented by the formula (XI);

$$R^{311}_a R^{312}_b SiX_{4-(a+b)} \quad (XI)$$

in which each of $R^{311}$ and $R^{312}$ independently is an alkyl group, an alkenyl group, an aryl group or a hydrocarbon group substituted with halogen, epoxy, amino, mercapto, methacryloyl or cyano; X is one hydrolysis group selected from the group consisting of an alkoxy group, an alkoxyalkoxy group, a halogen atom and an acyloxy group; each of a and b is 0, 1 or 2 provided a+b is 1 or 2.

Hydrolysis products of the silicon compounds can also be used.

Preferred examples of the inorganic compounds forming the inorganic particles include oxides of metals such as aluminum, titanium, zirconium and antimony. The inorganic compounds are available in the form of particle or dispersion in water and/or organic solvent. The inorganic compound (particles) is dispersed in the above organic material and employed for forming the layer having higher refractive index.

As materials for forming the layer having higher refractive index, further employable are the following inorganic materials which have film-forming properties and can be dispersed in solvent or are per se in liquid form. Examples of the inorganic materials include alkoxides of various elements, salts of organic acids, coordination compounds bonded to compound capable of forming coordination (e.g., chelate compounds), and activated inorganic polymers. Preferred examples of the inorganic materials include metal alkoxides such as titanium tetraethoxide, titanium tetraisopropoxide, titanium tetra-n-propoxide, titanium tetra-n-butoxide, titanium tetra-sec-butoxide, titanium tetra-tert-butoxide, aluminum triethoxide, aluminum triisopropoxide, aluminum tributoxide, antimony triethoxide, antimony tributoxide, zirconium tetraethoxide, zirconium tetraisopropoxide, zirconium tetra-n-propoxide, zirconium tetra-n-butoxide, zirconium tetra-sec-butoxide and zirconium tetra-tert-butoxide; chelate compounds such as diisopropoxytitanium-bis(acetylacetonate), dibutoxytitanium-bis(acetylacetonate), diethoxytitanium-bis(acetylacetonate),bis(acetylacetone)zirconium, aluminum acetylacetonate, aluminum di-n-butoxide monoethylacetylacetate, aluminum diisopropoxide monomethylacetoacetate and tri-n-butoxide zirconium monoethylacetoacetate;, and activated inorganic polymers comprising main component of zirconyl carbonate ammonium or zirconium.

Further, various alkylsilicates or hydrolysis products thereof, and fine silica particles (especially silica gel in colloidal state), although they have relatively low refractive index, can be employed in combination with the above inorganic materials.

The high refractive index layer has a thickness preferably in the range of 50 to 300 μm, more preferably in the range of 70 to 180 μm, and most preferably in the range of 90 to 155 μm.

Plasma display panel

An anti-reflection film can be incorporated in a display device such as a liquid crystal display (LCD), a plasma display panel (PDP), an electroluminscence display (ELD) or a cathode ray tube display (CRT). The back surface of the film is attached to the display surface. In the display device provided with the anti-reflection film of the invention, displayed image is easily observed. The anti-reflection film of the present invention can be advantageously used in a plasma display panel (PDP)

The a plasma display panel (PDP) comprises gas, glass plates, an electrode, an electrode lead, printed materials and a phosphor. The glass plates comprise a front glass plate and a back glass plate. The electrode is attached to the two glass plates. An insulated layer is printed on the two glass plates. Further, a phosphor layer is formed on the back glass plate. The gas is introduced between the two glass plate.

The plasma display panel (PDP) is commercially available. The anti-reflection film is attached to the display surface. In more detail, the film is attached to the front glass plate or a protective plate (plastic plate) by using an adhesive. Examples of the adhesives include a phenol resin, an epoxy resin, polyurethane, α-cyanoacrylate, vinyl acetate, chloroprene rubber and nitryl rubber. The epoxy resin and the chloroprene rubber are preferred.

SYNTHESIS EXAMPLE 3

Synthesis of fluoropolymer fine particles

In a three neck flask of 2 liters having a cooling tube and a stirring device, a solution of 30 g of sodium dodecylbenzenesulfate in 1,350 ml of distilled-water was placed. Further, a mixture of 240 g (1.02 mole) of hexafluoroisopropyl methacrylate and 60 g (0.46 mole) of divinylbenzene was added to the flask. The mixture was stirred at 200 rpm in a stream of nitrogen. After the flask was heated to 75° C., 50 ml of 8 wt. % aqueous solution of sodium persulfate was added to the mixture. The polymerization reaction was conducted for 2 hours. Further, 50 ml of 8 wt. % aqueous solution of sodium persulfate was added to the mixture, and the reaction was conducted for 2 hours. The reaction mixture was cooled to the room temperature, and dialyzed through a cellulose membrane (tractional molecular weight: 10,000) to remove the excess surface active agent and inorganic salts from the solution. The solution was filtered off to remove insoluble matters. Thus 2,780 g of white aqueous fine emulsion was obtained. The solution was in the form of a latex having the solid content of 10.3 wt. %, The average particle size of the latex was 26 nm.

The obtained latex was placed in a three neck flask of 5 liters having a cooling tube and a stirring device. Further, a mixture of 36 g (0.10 mole) of hexafluoroisopropyl methacrylate and 14 g (0.11 mole) of allyl methacrylate was added to the flask. The mixture was stirred at 200 rpm for 20 minutes in a stream of nitrogen. After the flask was heated to 75° C., 50 ml of 8 wt. % aqueous solution of sodium persulfate was added to the mixture The polymerization reaction was conducted for 2 hours. Further, 50 ml of 8 wt. % aqueous solution of sodium persulfate was added to the mixture, and the reaction was conducted for 2 hours. The reaction mixture was cooled to the room temperature, and filtered off through a paper filter to remove insoluble matters. Thus 2,817 g of white aqueous fine emulsion was obtained. The emulsion was in the form of a latex having the solid content of 10.9 wt. %. The average particle size of the latex was 29 nm. The polymer particles LP1 was prepared.

Fluoropolymer particles can be synthesized according to an emulsion polymerization method described above. The particles LP1 and other particles LP2 to LP4 synthesized in a similar manner are shown below.

Particles LP1 (semitransparent milky white, solid content: 10.9 wt. %, average particle size: 29 nm)
Core (86 wt. %): Hexafluoroisopropyl methacrylate (80 wt. %)-divinylbenzene (20 wt. %) copolymer
Shell (14 wt. %): Hexafluoroisopropyl methacrylate (72 wt. %)-allyl methacrylate (28 wt. %) copolymer Particles LP2 (semitransparent milky white, solid content: 9.6 wt. %, average particle size: 33 nm)
Core (90 wt. %): Hexafluoroisopropyl methacrylate (80 wt. %)-divinylbenzene (20 wt. %) copolymer
Shell (10 wt. %): trifluoroethyl methacrylate (65 wt. %)-glycidyl methacrylate (35 wt. %) copolymer Particles LP3 (semitransparent milky white, solid content: 8.5 wt. %, average particle size: 56 nm)
Core (90 wt. %): 1H,1H-perfluoro-n-octyl methacrylate (80 wt. %)-hexafluoroisopropyl methacrylate (15 wt. %)-1,3,5-cyclohexane trimethacrylate (5 wt. %) copolymer
Shell (10 wt. %). Hexafluoroisopropyl methacrylate (90 wt. %)-glycidyl methacrylate (10 wt. %) copolymer Particles LP4 (semitransparent milky white, solid content: 11.1 wt. %, average particle size: 45 nm)
Core (95 wt. %): Perfluorocyclohexlmethyl methacrylate (75 wt. %)-divinylbenzene (25 wt. %) copolymer
Shell (15 wt. %): 1H,1H,2H,2H-perfluorodecyl methacylate (65 wt. %)-vinyl cinnamate (35 wt. %) copolymer

SYNTHESIS EXAMPLE 4

Synthesis of methacrylic ester polymer particles

In a three neck flask of 2 liters having a cooling tube and a stirring device, a solution of 30 g of sodium dodecylbenzenesulfate in 1350 ml of distilled water was placed. Further, a mixture of 240 g (1.69 mole) of butyl methacrylate and 60 g (0.70 mole) of methacrylic acid was added to the flask. The mixture was stirred at 200 rpm in a stream of nitrogen. After the flask was heated to 75° C., 50 ml of 8 wt. % aqueous solution of sodium persulfate was added to the mixture, and the polymerization reaction was conducted for 2 hours. Further, 50 ml of 8 wt. % aqueous solution of sodium persulfate was added to the mixture, and the polymerization reaction was conducted for 2 hours. The reaction mixture was cooled to the room temperature, and filtered off to remove insoluble matters. Thus 1,727 g of white aqueous fine emulsion was obtained. The emulsion was in the form of a latex having the solid content of 12.9 wt. %. The average particle size of the latex was 36 nm. The polymer particles HP1 was prepared.

Other particles can be synthesized according to an emulsion polymerization method described above. The particles HP1 and other particles HP2 to HP4 sythesized in a similar manner are shown below.

Particles HP1 (semitransparent milky white, solid content: 12.9 wt. %, average particle size: 36 nm)
n-Butyl methacrylate (80 wt. %)-methacrylic acid (20 wt. %) copolymer Particles HP2 (semitransparent milky white, solid content; 21.1 wt. %, average particle size: 54 nm)
Methyl methacrylate (65 wt. %)-ethyl methacrylate (25 wt. %)-acrylic acid (10 wt. %) copolymer Particles HP3 (milky white, solid content: 16.3 wt. %, average particle size: 43 nm)
Benzyl methacrylate (50 wt. %)-methyl methacrylate (25 wt. %)-allyl methacrylate (20 wt. %)-methacrylic acid (5 wt. %) copolymer Particles HP4 (milky white, solid content: 10.7 wt. %, average particle size: 76 nm)
Methyl methacrylate (35 wt. %)-styrene (20 wt. %)-2-β-naphthylethyl methacrylate (15 wt. %)-glycidyl methacrylate (10 wt. %)-allyl methacrylate (10 wt. %)-acrylic acid (10 wt. %) copolymer

EXAMPLE 1

(1) Formation of infrared absorbing layer

A cellulose triacetate film (thickness: 90 μm) was used as the transparent support.

In 2-butanone, 5 wt. % of dipentaerythrytol hexaacrylate, 0.5 wt. % of a photopolymerization initiator (Irgacure 907, Ciba-Geigy), 0.2 wt. % of a photosensitizer (Kayacure DETX Nippon KaYaku Co., Ltd.), 0.2 wt. % of the infrared absorbing dye (501), 0.2 wt. % of the infrared absorbing dye (601) and 0.2 wt. % of the infrared absorbing dye (602) were dissolved.

The obtained solution was coated on the transparent support by using a wire bar to form a layer (thickness: 8 μm). The coated layer was dried and heated to 100° C. An ultraviolet ray was irradiated to the layer by using a high pressure mercury lamp (12 W/cm) for 1 minute to harden the layer. The layer was cooled to the room temperature.

(2) Formation of high refractive index layer

With 100 g of the latex HP1, 25 g of tin oxide fine particles (Ishiwara Industries) were mixed. In 100 g of water, 6 g of dipentaerythrytol hexaacrylate, 0.5 g of a photopolymerization initiator (Irgacure 907, Ciba-Geigy), 0.2 g of a photosensitizer (Kayacure DETX, Nippon Kayaku Co., Ltd.) and 20 g of ethyl acetate were mixed and emulsified by using 1 g of sodium dodecylbenzenesulfonate. The obtained emulsion was added to the mixture, and the resulting mixture was stirred to form a coating solution.

The coating solution was coated on the hard coating layer by using a wire bar to form a high refractive index layer (thickness: 0.16 μm). The coated layer was dried and heated to 100° C. An ultraviolet ray was irradiated to the layer by using a high pressure mercury lamp (12 W/cm) for 1 minute to harden the layer. The layer was cooled to the room temperature.

(3) Formation of low refractive index layer

In 100 g of water, 6 g of dipentaerythrytol hexaacrylate, 0.5 g of a photopolymerization initiator (Irgacure 907, Ciba-Geigy), 0.2 g of a photosensitizer (Kayacure DETX, Nippon Kayaku Co., Ltd.) and 20 g of ethyl acetate were mixed and emulsified by using 1 g of sodium dodecylbenzenesulfonate. The obtained emulsion was added to 87 g of the latex LP1, and the resulting mixture was stirred to form a coating solution.

The coating solution was coated on the high refractive index layer by using a wire bar to form a low refractive index layer (thickness: 0.10 μm). The coated layer was dried and heated to 100° C. An ultraviolet ray was irradiated to the layer by using a high pressure mercury lamp (12 W/cm) for 1 minute to harden the layer. The layer was cooled to the room temperature.

The average reflectance within the visible region (400 to 800 nm) of the obtained film was 0.4%. The mechanical strength (surface hardness) of the layer was 4H of the pencil grades. The transmittance of the film within the infrared region of 800 to 1,100 nm was 10 to 25%.

EXAMPLE 2

(1) Preparation of solid fine particles of infrared absorbing dye

The infrared absorbing dye (26) was treated in the state of wet cake without drying. To the dye (dry solid weight: 2.5 g), 15 g of 5% aqueous solution of carboxymethylcelluloses was added. Water was added to the mixture make the total amount 63.3 g. The mixture was well stirred to make slurry. The slurry and 100 cc of glass beads (diameter: 0.8 to 1.2 mm) were placed in a dispersing device (1/16 G sand grinder mill, Aimex Co., Ltd.). The slurry was stirred for 12 hours. Water was added to the slurry to form a solid fine particle dispersion having a dye Concentration of 2 wt. %.

(2) Formation of infrared absorbing layer

A cellulose triacetate film (thickness: 90 μm) was used as the transparent support.

The solid fine particle dispersion of the infrared absorbing dye (26) was coated on one surface of the transparent support in the amount of 100 mg per m² to form an infrared absorbing layer.

(3) Formation of hard coating layer

A cellulose triacetate film (thickness: 90 μm) was used as the transparent support.

In 2-butanone, 5 wt. % of dipentaerythrytol hexaacrylate, 0.5 wt. % of a photopolymerization initiator (Irgacure 907, Ciba-Geigy) and 0.2 wt. % of a photosensitizer (Kayacure DETX, Nippon Xayaku Co., Ltd.) were dissolved.

The obtained solution was coated on the other surface of the transparent support by using a wire bar to form a layer (thickness: 8 μm). The coated layer was dried and heated to 100° C. An ultraviolet ray was irradiated to the layer by u sing a high pressure mercury lamp (12 W/cmp for 1 minute to harden the layer. The layer was cooled to the room temperature.

(4) Formation of high and low refractive index layers

A high refractive index layer and a low refractive index layer were formed on the hard coating layer in the same manner as in Example 1.

The average reflectance within the visible region (400 to 800 nm) of the obtained film was 0.4%. The mechanical strength (surface hardness) of the layer was 5H of the pencil grades. The transmittance of the film within the infrared region of 800 to 1,1000 nm was 10 to 30%.

EXAMPLE 3

A first infrared absorbing layer was formed on one surface of the transparent support in the same manner as in Example 2. Further, a second infrared absorbing layer was formed on the other surface of the transparent support in the same manner as in Example 1. Further, a high refractive index layer and a low refractive index layer were formed on the second infrared layer in the same manner as in Example 1.

The average reflectance within the visible region (400 to 800 nm) of the obtained film was 0.4%. The mechanical strength (surface hardness) of the layer was 5H of the pencil grades. The transmittance of the film within the infrared region of 800 to 1,100 nm was 7 to 20%.

EXAMPLES 4 TO 8

Anti-reflection films were prepared in the same manner as in Example 1, except that the particles used in the high refractive index layer and the particles used in the low refractive index layer set forth in Table 1 were used. The contents of the components were so adjusted that the solid contents of the coating solutions were the same as in Example 1.

The films were evaluated in the same manner as in Example 1. The results are set forth in Table 1. Each of the transmittances of the films within the infrared region of 800 to 1,100 nm was the same as the film of Example 1 (10 to 25%).

Further, a film having no infrared absorbing layer was prepared. The transmittance of the film within the infrared region of 800 to 1,100 nm was 90 to 98%.

TABLE 1

| Anti-reflection film | High refractive layer | Low refractive layer | Surface re-flectance | Surface hardness |
| --- | --- | --- | --- | --- |
| Example 1 | HP1 | LP1 | 0.4% | 5 H |
| Example 4 | HP2 | LP1 | 0.6% | 5 H |
| Example 5 | HP3 | LP2 | 0.4% | 4 H |
| Example 6 | HP4 | LP2 | 0.5% | 5 H |
| Example 7 | HP1 | LP3 | 0.5% | 5 H |
| Example 8 | HP3 | LP4 | 0.4% | 5 H |

EXAMPLE 9

The back surface of the anti-reflection film prepared in Example 3 was attached to the display surface of a plasma display panel (PDS4201J, Fujitsu General Co., Ltd.) by using an adhesive (Aika Aibon E-5050, Aika Co., Ltd.).

The image on the display was easily observed without reflecting light of a fluorescent lamp, compared with a plasma display panel having no anti-reflection film. Further, a television was placed parallel to the plasma display. However, the remote controller of the television did not malfunction.

We claim:

1. An anti-reflection film comprising a transparent support, an infrared absorbing layer containing an infrared absorbing dye and a low refractive index layer in the order, said low refractive index layer comprising a binder polymer and micro polymer particles, said micro polymer particles being superposed upon each other to form micro voids surrounded by the particles, said low refractive index layer having a refractive index of not higher than 1.45, said low refractive index layer having a surface average reflectance of not higher than 1% within the wavelength range of 400 to 800 nm, and said film having a transmittance of not higher than 40% at a wavelength within the wavelength range of 800 to 1,100 nm.

2. The anti-reflection film as defined in claim 1, wherein a high refractive index layer having a refractive index of not lower than 1.6 is provided between the infrared absorbing layer and the low refractive index layer.

3. The anti-reflection film as defined in claim 1, wherein the infrared absorbing dye is in the form of solid fine particles dispersed in the infrared absorbing layer.

4. The anti-reflection film as defined in claim 1, wherein the infrared absorbing layer has a thickness in the range of 0.5 to 10 μm.

5. The anti-reflection film as defined in claim 1, wherein the low refractive index layer comprises a polymer containing fluorine atoms in an amount of 35 to 75 wt. %.

6. A plasma display panel having a display surface covered with an anti-reflection film defined in claim 1.

7. An anti-reflection film comprising an infrared absorbing layer containing an infrared absorbing dye, a transparent support and a low refractive index layer in the order, said low refractive index layer comprising a binder polymer and micro polymer particles, said micro polymer particles being superposed upon each other to form micro voids surrounded by the particles, said low refractive index layer having a refractive index of not higher than 1.45, said low refractive index layer having a surface average reflectance of not higher than 1% within the wavelength range of 400 to 800 nm, and said film having a transmittance of not higher than 40% at a wavelength within the wavelength range of 800 to 1,100 nm.

8. The anti-reflection film as defined in claim 7, wherein a high refractive index layer having a refractive index of not lower than 1.6 is provided between the transparent support and the low refractive index layer.

9. The anti-reflection film as defined in claim 7, wherein the infrared absorbing dye is in the form of solid fine particles dispersed in the infrared absorbing layer.

10. The anti-reflection film as defined in claim 7, wherein the infrared absorbing layer has a thickness in the range of 0.5 to 10 $\mu$m.

11. The anti-reflection film as defined in claim 7, wherein the low refractive index layer comprises a polymer containing fluorine atoms in an amount of 35 to 75 wt. %.

12. A plasma display panel having a display surface covered with an anti-reflection film defined in claim 7.

\* \* \* \* \*